US008696257B2

(12) United States Patent
Saito et al.

(10) Patent No.: US 8,696,257 B2
(45) Date of Patent: Apr. 15, 2014

(54) CUTTING INSERT AND REMOVABLE INSERT-TYPE CUTTING TOOL

(75) Inventors: Takayoshi Saito, Shimotsuma (JP); Nobukazu Horiike, Tsukuba (JP); Jun Kitajima, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 204 days.

(21) Appl. No.: 13/254,514

(22) PCT Filed: Mar. 8, 2010

(86) PCT No.: PCT/JP2010/001606
§ 371 (c)(1),
(2), (4) Date: Nov. 16, 2011

(87) PCT Pub. No.: WO2010/100953
PCT Pub. Date: Sep. 10, 2010

(65) Prior Publication Data
US 2012/0051851 A1 Mar. 1, 2012

(30) Foreign Application Priority Data

Mar. 6, 2009 (JP) ................................ P2009-053611
Feb. 23, 2010 (JP) ................................ P2010-037222

(51) Int. Cl.
*B23C 5/20* (2006.01)
(52) U.S. Cl.
USPC .................. 407/42; 407/48; 407/61; 407/113
(58) Field of Classification Search
CPC ........................................................ B23C 5/20
USPC ............................ 407/42, 48, 58, 59, 61, 113
See application file for complete search history.

(56) References Cited

U.S. PATENT DOCUMENTS

| 4,212,568 A | 7/1980 | Minicozzi | |
|---|---|---|---|
| 4,573,831 A * | 3/1986 | Lacey | 407/42 |

(Continued)

FOREIGN PATENT DOCUMENTS

| CN | 101125376 A | 2/2008 |
|---|---|---|
| CN | 101264533 A | 9/2008 |

(Continued)

OTHER PUBLICATIONS

Search Report enclosed in the Office Action mailed Mar. 5, 2013, issued for the Chinese Patent Application No. 2010800108590 and English partial translation of the Search Report.

(Continued)

*Primary Examiner* — Daniel Howell
*Assistant Examiner* — Ryan Rufo
(74) *Attorney, Agent, or Firm* — Edwards Wildman Palmer LLP

(57) ABSTRACT

The cutting insert is provided with a polygonal-shaped insert main body (2) having two polygonal surfaces (3, 3) spaced away from each other and a plurality of side surfaces formed between these polygonal surfaces and also provided with cutting edges (8A, 8B, 8C) formed as a rake face on a peripheral edge of a first side surface (4) among the plurality of side surfaces. Among the plurality of side surfaces, a second side surface (6) which is positioned on the opposite side of the first side surface and given as a seating surface in contact with an insert seat of the tool main body for attaching the cutting insert is formed in a V-shape when viewed from the thickness direction of the insert main body and includes two contact portions (6A, 6A), each of which is formed in a raised curve shape on a cross section along the thickness direction, and the two contact portions are formed in a recessed V-shape so as to be greater in depth moving toward the center of the second side surface on the cross section along the thickness direction.

20 Claims, 17 Drawing Sheets

(56) References Cited

U.S. PATENT DOCUMENTS

| | | | |
|---|---|---|---|
| 4,934,878 A | 6/1990 | Plutschuck et al. | |
| 5,603,365 A * | 2/1997 | Stewart | 144/230 |
| 6,120,219 A | 9/2000 | Satran et al. | |
| 6,238,146 B1 * | 5/2001 | Satran et al. | 407/113 |
| 2006/0120812 A1 * | 6/2006 | Hecht et al. | 407/48 |

FOREIGN PATENT DOCUMENTS

| | | |
|---|---|---|
| DE | 19516893 A1 | 11/1996 |
| IT | 1121024 B | 3/1986 |
| JP | 04-275816 A | 10/1992 |
| JP | 2002-512892 A | 5/2002 |
| JP | 2006-167874 A | 6/2006 |
| JP | 2007-098506 A | 4/2007 |
| JP | 2008-018515 A | 1/2008 |
| WO | WO-03/047799 A1 | 6/2003 |
| WO | WO-2004/050283 A1 | 6/2004 |

OTHER PUBLICATIONS

Office Action mailed Jun. 25, 2013, issued for the Japanese patent application No. 2011-502675 and English translation thereof.
International Search Report dated Jun. 1, 2010, issued for PCT/JP2010/001606 and English translation thereof.
Supplementary European Search Report dated Oct. 31, 2013, issued for the European patent application No. 10748552.6.

* cited by examiner

US 8,696,257 B2

CUTTING INSERT AND REMOVABLE INSERT-TYPE CUTTING TOOL

TECHNICAL FIELD

The present invention relates to a cutting insert which is attached removably to a removable insert-type cutting tool used, in particular, in milling machining and also relate to a removable insert-type cutting tool to which the cutting insert is attached.

The present application concerned is to claim the right of priority to the patent application No. 2009-53611 filed on Mar. 6, 2009 and the patent application No. 2010-37222 filed on Feb. 23, 2010, the content of which is cited herewith,

BACKGROUND ART OF THE INVENTION

As a cutting insert attached to the above-described removable insert-type cutting tool for milling machining and to a removable insert-type cutting tool to which the cutting insert is attached, there are known, for example, those described in Patent Document 1, in the cutting insert and the removable insert-type cutting tool described in Patent Document 1, a chip removing flute is formed on an outer circumference of a cylindrical tool main body which rotates axially. Furthermore, on an outer circumference of the tool main body, there are formed a plurality of insert seats opened on a wall surface of the chip removing flute facing forward in the rotating direction of the tool main body. The cutting insert is attached to each of the insert seats.

In this instance, the above-described cutting insert is a flat plate formed approximately in a regular triangle shape, with one of the regular triangle surfaces thereof facing outside in the radial direction of the tool main body. Furthermore, the opposite regular triangle surface is closely attached to the bottom surface of the insert seat facing outside in the radial direction of the tool main body. One of the three side surfaces around the regular triangle surface faces forward as a rake face in the rotating direction of the tool main body. The remaining two side surfaces are closely attached respectively to a pair of wall surfaces of the insert seat formed in a recessed V-shape.

As described above, in the removable insert-type cutting tool to which the cutting insert is attached, on cutting a workpiece, the tool main body is rotated around the axis line and also fed out in a direction intersecting with the axis line. Thereby, a cutting edge formed at a ridge part between regular triangle surfaces positioned outside in the radial direction of the tool main body is used to out the workpiece on the rake face of the cutting insert, thus forming a machined surface on the workpiece.

PRIOR ART DOCUMENT

Patent Document

Patent Document 1: U.S. Pat. No. 4,934,678

DETAILED DESCRIPTION OF THE INVENTION

Problems to be Solved by the Invention

Incidentally, in the cutting insert described in Patent Document 1, as shown in FIG. 2 and FIG. 6 of Patent Document 1, on attachment of the cutting insert to the insert seat, the regular triangle surface of the cutting insert facing inside in the radial direction of the tool main body is closely attached to the bottom surface of the insert seat facing outside in the radial direction of the tool main body. Furthermore, at this time, two side surfaces other than a side surface which is given as the rake face of the cutting insert are closely attached to the pair of the wall surfaces of the insert seat formed in a V-shape.

However, it is extremely difficult to form the cutting insert and the insert seat in such a manner that all three flat surfaces of the cutting insert are entirely closely attached to three flat surfaces of the insert seat in particular, where the cutting insert is a hard sintered body made with cemented carbide or the like, a dimensional allowance thereof will greatly influence the rigidity and the accuracy on attachment of the cutting insert to the insert seat.

For example, a recessed bottom surface of the insert seat and wall surfaces thereof formed in a V-shape are assumed to be formed so as to intersect with each other exactly in a perpendicular manner. In this instance, even where the cutting insert is in an acceptable range of allowance, such a formation error may be found that a side surface is not perpendicular to the regular triangle surface of the cutting insert closely attached to the bottom surface of the insert seat but inclines at an extremely small angle. Then, a ridge part between the side surface of the cutting insert and the regular triangle surface is in line contact with a part close to the bottom surface of the pair of V-shape wall surfaces of the insert seat. Alternatively, the side surface of the cutting insert is in line contact with a border between the wall surface of the insert seat and an outer circumference surface of the tool main body. As described above, the cutting insert is attached to the insert seat of the tool main body, while in line contact with the tool main body.

Therefore, in the cutting insert attached as described above, the attachment posture will greatly vary, depending on a position at which the side surface of the cutting insert is in contact with the wall surface of the insert seat, and there is a possibility that the attachment accuracy will be diminished. Furthermore, the cutting insert is unstably seated on the insert seat, by which the cutting insert is unable to secure sufficient rigidity on attachment. Thus, this may cause a possible reduction in machining accuracy.

Furthermore, in the removable insert-type cutting tool described in Patent Document 1, the cutting insert is a flat plate formed in a regular triangle shape, and two side surfaces other than a side surface which is given as the rake face of the cutting insert are attached to the tool main body in a state of being in contact with the wall surfaces of the insert seat which are formed in a recessed V-shape. In this instance, in order to secure rigidity on attachment of the cutting insert, as shown in FIG. 1 of Patent Document 1, a certain clearance must be maintained between the wall surfaces of adjacent insert seats on one chip removing flute.

Therefore, in this instance, there are restrictions on the number of cutting inserts which can be attached along one chip removing flute. Furthermore, conditions are required in order to complement a part of the clearance between the wall surfaces of insert seats and form a machined surface which is straight with respect to a workpiece. That is, it is necessary to overlap rotating loci around the axis line of cutting edges of the cutting inserts on one chip removing flute with rotating loci of cutting edges of the cutting inserts attached to insert seats formed on the other chip removing flute in the axial direction. In this instance, since the cutting edges formed on cutting inserts arranged on a plurality of chip removing flutes constitute an array of cutting edges in which the rotating loci are made continuous, it is difficult to improve the machining efficiency. This will cause a problem in particular, for example, in a removable insert-type cutting tool for milling machining with a long cutting edge longer in edge length of the array of cutting edges in the axial direction.

The present invention has been made in view of the above-described situation, and one object thereof is to provide a cutting insert which can be stably attached to an insert seat at a high accuracy irrespective of a dimensional allowance of the cutting insert and a removable insert-type cutting tool to which the cutting insert is attached. Another object is to provide a cutting insert capable of performing milling machining efficiently by overlapping the cutting edges of cutting inserts attached along one chip removing flute to increase the number of cutting inserts which can be attached even to a cutting tool with a cutting edge long in edge length in the axial direction in a removable insert-type cutting tool for milling machining in particular, and a removable insert-type cutting tool to which the cutting insert is attached.

Means for Solving the Problems

A first mode of the cutting insert of the present invention is a cutting insert which is attached to a tool main body of a removable insert-type cutting tool or the cutting insert which is provided with an insert main body having an upper surface, a lower surface and a plurality of side surfaces. A first cutting edge is formed at a ridge part between a first side surface of the plurality of side surfaces as a rake face and the upper surface, and the lower surface is formed in a flat surface shape which can be closely attached to the tool main body. A second side surface which is positioned on the opposite side of the insert main body with respect to the first side surface and given as a seating surface in contact with an insert seat of the tool main body for attaching the cutting insert is formed in a V-shape when viewed from above, that is, when the insert main body is viewed in the thickness direction and formed in a recessed V-shape when viewed from a cross section intersecting with the lower surface and the second side surface. Of a first contact surface and a second contact surface formed in the recessed V-shape, a first contact portion which can be in contact with the tool main body is formed on the first contact surface closer to the upper surface than the lower surface. The first contact portion is formed in such a manner that the first contact surface is raised in a curve shape when viewed from the above-described cross section.

In above-described cutting insert, a second cutting edge is formed at a ridge part between the lower surface and the first side surface on the insert main body, and the upper surface is formed in a flat surface shape which can be closely attached to the tool main body. A second contact portion which can be in contact with the tool main body is formed on the second contact surface closer to the lower surface than the upper surface of the second side surface. The second contact portion may be formed in such a manner that the second contact surface is raised in a curve shape when viewed from the above-described cross section.

A first mode of the removable cutting tool of the present invention is provided with the first mode of the above-described cutting insert and a tool main body having an insert seat capable of removably attaching the cutting insert. The insert seat is provided with a bottom surface which faces in the radial direction of the tool main body and which is formed in a flat surface shape so as to be closely attached to the upper surface or the lower surface of the insert main body and a wall surface formed so that the second side surface of the insert main body can be in contact therewith. When the insert main body is viewed from the radial direction of the tool main body, the wall surface is formed in a V-shape which is reverse to the second side surface and is formed so as to be fitted into the second side surface of the insert main body.

A second mode of the cutting insert of the present invention is provided with a polygonal-shape insert main body having two polygonal surfaces which are spaced away from each other and a plurality of side surfaces formed between these polygonal surfaces and also provided with a cutting edge which is formed as a rake face on a peripheral edge of the first side surface among the plurality of side surfaces. With regard to the plurality of side surfaces, the second side surface which is positioned on the opposite side of the first side surface and given as a seating surface in contact with an insert seat of the tool main body for attaching the cutting insert is formed in a V-shape when viewed in the thickness direction of the insert main body and includes two contact portions, each of which is formed in a raised curve shape at a cross section along the thickness direction. These two contact portions are formed in a recessed V-shape so as to be greater in depth moving toward the center of the second side surface on the cross section along the thickness direction.

A second mode of the removable insert-type cutting tool of the present invention is provided with the second mode of the cutting insert and a tool main body on which an insert seat capable of removably attaching the cutting insert is formed and which is rotated around the axis line. The insert seat is formed on an outer circumference of the tool main body, with the wall surface facing in the rotating direction of the cutting tool and also with the bottom surface facing to the outer circumference or in the direction of the axis line. The insert seat is provided with a bottom surface and a wall surface. Of these two polygonal surfaces, one of the polygonal surfaces is closely attached to the bottom surface of the insert seat, and, of these two contact portions, one of the contact portions closer to the other polygonal surface is in contact with the wall surface formed in a V-shape which is reverse to the second side surface in a relationship to fit to each other when viewed from the thickness direction.

In the cutting insert of the present invention, the insert main body formed in a polygonal flat plate is provided with a side surface given as a rake face, a pair of side surfaces intersecting with the rake face and moving to the opposite side of the rake face and a seating surface which is positioned on the opposite side of the rake face and formed in a V-shape. Furthermore, the insert main body is formed at least in a pentagonal shape when the insert main body opposite to the polygonal surface is viewed in the thickness direction. In the insert main body, of the pair of polygonal surfaces, one of the polygonal surfaces is closely attached to the bottom surface of the insert seat, while the V-shape seating surface is in contact with the wall surface of the insert seat formed in a V-shape reverse in a relationship to fit to each other and attached to the insert seat.

That is, in the above-constituted cutting insert, the cutting insert can be attached to an insert seat by the pair of side surfaces extending between the rake face and the seating surface, with the cutting insert not being in contact with the wall surface of the insert seat or the like. In the above-described removable insert-type cutting tool of the present invention, there is such a case that the bottom surface of the insert seat faces to an outer circumference (outside in the radial direction) of the tool main body. In this case, for example, as described in the removable insert-type cutting tool of Patent Document 1, a plurality of cutting inserts may be attached along a chip removing flute. Even in this case, it is not necessary to form, on an adjacent insert seat, a wall surface with which the pair of side surfaces is in contact so as to be a clearance therebetween. On the other hand, since the seating surface is in contact with the wall surface of the insert seat in a V-shape reverse in a relationship to fit to each other, the rigidity and stability on attaching the cutting insert to the insert seat can be absolutely ensured.

Therefore, it is possible to arrange the plurality of cutting inserts in close proximity with each other and also increase the number of cutting inserts which can be attached along one chip removing flute. It is also possible to overlap the cutting edges of the cutting inserts and constitute an array of cutting edges having continuous rotating loci. As a result, the thus constituted removable insert-type cutting tool is able to improve machining efficiency. This is favorably applicable in particular to a removable insert-type cutting tool having the above array of cutting edges longer in edge length.

Then, in the cutting insert of the present invention, the seating surface formed in a V-shape when viewed in the thickness direction is formed in a recessed V-shape on the cross section along the thickness direction. The V-shape surface which forms a recessed V-shape and is gradually recessed moving toward the center in the thickness direction is constituted with a pair of contact portions formed in a raised curve shape on the above cross section. On attachment of the cutting insert, a contact portion opposite in the thickness direction from one of the polygonal surfaces closely attached to the bottom surface of the insert seat is in contact with the wall surface of the insert seat.

Therefore, even if there is found a slight error at an included angle of a recessed V-shape formed by the cross section of the seating surface or the like within a range of machining allowance to change an inclination of the V-shape surface formed by a pair of contact portions, the contact portion only changes in such a manner that the raised curve shape formed by the cross section deviates in the circumferential direction. Therefore, a position in contact with the wall surface is not changed greatly or a posture of attaching the cutting insert is not changed either. Furthermore, the contact portion in contact with the wall surface is positioned on the opposite side of one of the polygonal surfaces closely attached to the bottom surface in the thickness direction. As a result, the cutting insert can be attached at a high rigidity in relation to cutting loads and also the contact portions are formed in a raised curve shape when viewed from the cross section, by which the contact portions are in contact with the wall surface in a state more similar to surface contact than line contact. Therefore, the cutting insert can be seated more stably.

Therefore, according to the above-constituted cutting insert, influences on accuracy on attachment to the insert seat by the dimensional allowance can be suppressed as much as possible. For example, even where the insert, main body is made with a hard sintered body such as cemented carbide, the hard sintered body can be attached to the insert seat as a sintered and non-polished product, thereby performing highly accurate machining. It is obvious that the above-described effect can be obtained in the removable insert-type cutting tool for milling machining when the bottom surface of the insert seat is faced to an outer circumference of the tool main body. Furthermore, the effect can be obtained, for example, in the case of a side cutter where the bottom surface of the insert seat is faced in the axial direction of the tool main body. Therefore, the cutting insert of the present invention can be used in various types of removable insert-type cutting tools.

In the above-described cutting insert, if an included angle of the V-shape formed by the seating surface when viewed in the thickness direction is excessively great and close to, for example, 180°, that is, the seating surface is close to a state of being extended straight, there is a possibility that no stability is obtained when the seating surface is in contact with the wall surfaces of the insert seat which are formed in a V-shape reverse to the seating surface in a relationship to fit to each other. On the other hand, where the included angle is excessively small, it is necessary to maintain the clearance between the wall surfaces of adjacent insert seats as described above, when a plurality of cutting inserts are arranged in close proximity. Then, there is a possibility that the above-described effect is not obtained securely. Thus, the included angle of the V-shape formed by the seating surface is preferably within a range of 90° to 150°.

Furthermore, the V-shape formed by the seating surface may be formed in a recessed V-shape such as that formed by the pair of contact portions. It is, however, preferable that the V-shape is formed so as to assume a raised V-shape in the following case. This is, for example, a case where in order to attach the cutting insert to the insert seat, an attachment hole for penetrating between the pair of polygonal surfaces in the thickness direction is formed on the insert main body and a clamp screw which has penetrated through the attachment hole is screwed into a thread hole of the insert seat bottom surface. In this case, the seating surface is formed so as to assume a raised V-shape when viewed in the thickness direction, by which the cutting insert can be attached more stably by securing sufficient thickness between the seating surface and the attachment hole without making excessively great the polygons of the insert main body.

Furthermore, there is a case where the included angle of a V-shape formed by the seating surface is made smaller than the included angle of a V-shape formed by the wall surfaces of the insert seat reverse in a relationship to fit to each other due to the above-described dimensional allowance or others. In this case, there is a possibility that the cutting insert attached to the insert seat will incline. Even in this case, a projection which projects from the seating surface is formed at both ends of a V-shape of the seating surface when viewed in the thickness direction. Thereby, of these projections, one of the projections to which the cutting insert inclines is in contact with, for example, a contacted surface formed at the both ends of the V-shape formed by the wall surfaces of the insert seat. Thereby, the cutting insert can be seated securely and stably. It is preferable that the projections are formed in a raised curved surface shape so as to be in contact with the contacted surface securely and stably.

It is also acceptable that a projection is formed at both ends of the V-shape formed by the seating surface and also the seating surface assumes a raised V-shape when viewed in the thickness direction. In this case, a pair of raised portions is formed at the top of the raised V-shape formed by the seating surface in the thickness direction at interval, and the projection is formed so as to be positioned between the pair of raised portions in the thickness direction. Thereby, particularly when the insert main body of the cutting insert is made with a hard sintered body as described above, it is possible to stably place a compressed powder body prior to sintering on a sintering plate at three supporting points, that is, one of the projections end the pair of raised portions.

The removable insert-type cutting tool of the present invention may be formed so as to be similar to that of Patent Document 1. In the cutting tool described in Patent Document 1, the tool main body is formed externally in a cylindrical shape at the center of the axis line, and there is formed, on the outer circumference surface thereof, a chip removing flute twisted around the axis line from the leading end of the tool main body to the rear end thereof. Then, the plurality of insert seats are formed, with the individual bottom surfaces facing to the outer circumference, in such a manner as to be opened on a wall surface of the chip removing flute facing in the rotating direction of the cutting tool. In this instance, the wall surfaces of the insert seat are arrayed so as to assume a shape of helical stairs along the twisted chip removing flute, thereby discharging chips generated by the cutting edges more efficiently, and performing smooth and stable milling machining.

That is, for example, in the cutting tool described in Patent Document 1, the plurality of cutting inserts attached to the insert seats formed along the twisted chip removing flute are disposed so as to project in the same height from the wall surface of the chip removing flute facing in the rotating direction of the cutting tool in such a manner that each of the rake faces thereof runs along the twisted chip removing flute. Then, all chips generated by cutting edges formed on the plurality of cutting inserts will flow into the one chip removing flute. Then, there is a possibility that the chips are likely to clog, thereby disrupting smooth discharge of the chips or resulting in entanglement of the chips.

On the other hand, in the above-constituted cutting insert, as described above, the side surface arranged on the opposite side of the rake face via the pair of side surfaces is given as a seating surface in contact with the wall surfaces of the insert seat. Therefore, the wall surface is formed in the shape of helical stairs running along the twisted chip removing flute and also having a step, by which the rake face on the opposite side of the seating surface seated on the wall surfaces is also disposed similar to the shape of helical stairs having a step along the twisted chip removing flute. Therefore, chips generated by the cutting edges of cutting inserts are individually accommodated at a step portion thereof formed on each rake face in the rotating direction of the cutting tool and then discharged. As a result, it is possible to prevent the chips from being entangled with each other or prevent the chips from clogging, thus making it possible to discharge the chips more efficiently. The wall surfaces of the insert seat and the rake face of the cutting insert formed so as to assume a shape of helical stairs may be spaced evenly or unevenly in the axial direction of the tool main body.

In the removable insert-type cutting tool of the present invention, it is also acceptable that the plurality of insert seats are formed on the tool main body and various types of the cutting inserts which are equal to each other in shape and dimension of the seating surface and different in radius of a corner edge formed as the cutting edge at a corner of a side ridge portion on the rake face are attached to the insert seats. Thereby, for example, even in such a case that an insert-removable radius end mill for performing cutting which gives a recessed circular arc on the cross section thereof at a corner between the wall surface of a machined surface and the bottom surface thereof is used to cut a corner of the recessed circular arc on the cross section different in radius, a cutting insert for cutting the corner is only exchanged with the other cutting insert having a different redius of the corner edge, thus making it possible to perform such the operations without exchanging the tool main body for another one.

Then, in production of various types of cutting inserts equal to each other in shape and dimension of the seating surface and also different in radius of the corner edge formed at a corner of the side ridge portion on the rake face, in the cutting insert of the present invention, it is acceptable that a border on the rake face of the polygonal surface is formed so as to project further in the thickness direction with respect to a portion of the insert closer to the seating surface than the border. Thereby, a starting point of the corner edge can be arranged on a border on the rake face of the polygonal surface projecting in the thickness direction. Therefore, even when the corner edge is increased in radius, it is possible to reliably avoid influences on the seating surface by which the seating surface is made different in shape and dimension.

Advantageous Effects of the Invention

As described above, the cutting insert of the present invention can be stably attached to an insert seat of the removable insert-type cutting tool at a high accuracy and also at a high rigidity, irrespective of its dimensional allowance. Therefore, the cutting tool can be used to stably perform highly accurate cutting machining. It is also possible to attach a plurality of cutting inserts in close proximity. As a result, when the cutting insert is used particularly in a removable insert-type cuffing tool for milling machining with a long cutting edge, the cutting edges of adjacent cutting inserts can be overlapped with each other to increase the number of cutting inserts to be attached, thus making it possible to improve machining efficiency.

DESCRIPTION OF EMBODIMENTS

Figure 1:
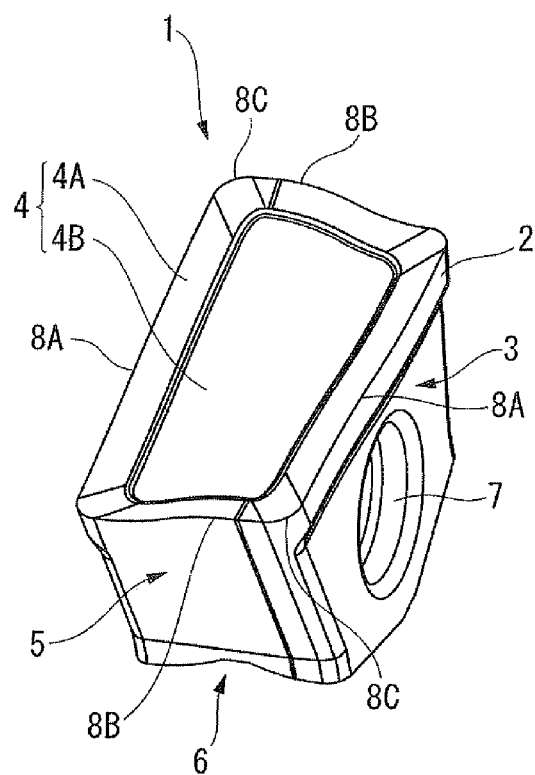
FIG. 1 is a perspective view which shows a first embodiment of a cutting insert of the present invention when viewed from the rake face.
Figure 2:
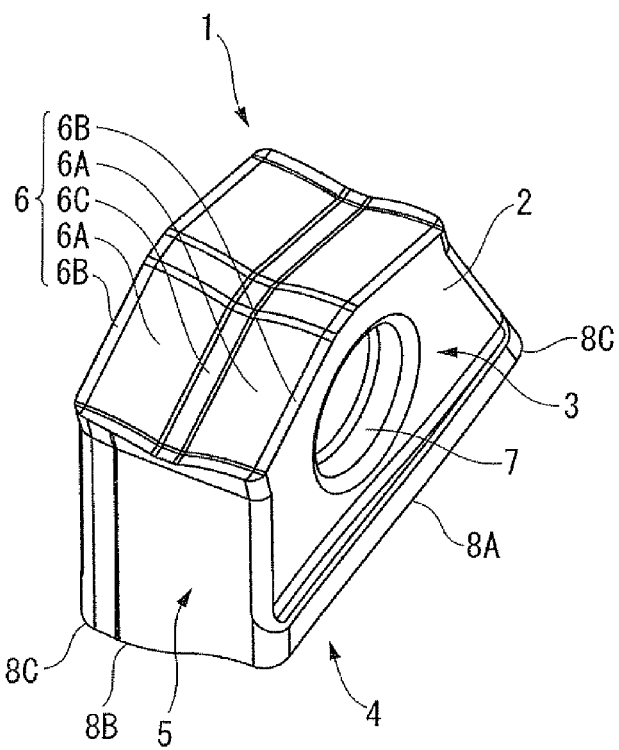
FIG. 2 is a drawing which shows an embodiment of the present invention.
Figure 3:
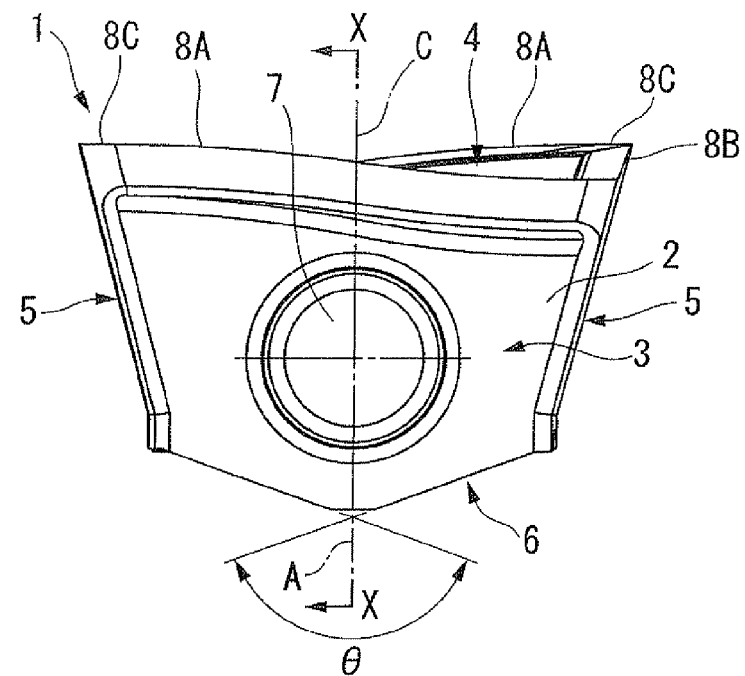
FIG. 3 is a front view of the embodiment shown in FIG. 1 when viewed in the thickness direction of an insert main body opposite to a pair of polygonal surfaces.

In the cutting insert 1 of the first embodiment of the present invention shown in FIG. 1 to FIG. 8, the insert main body 2 is formed with a hard sintered body such as cemented carbide so as to assume a polygonal flat plate as shown in FIG. 3. More specifically, in the present embodiment, the insert main body 2 is provided with a pair of polygonal surfaces (an upper surface and a lower surface) 3 which are formed approximately in a pentagonal shape, a rake face (a first side surface) 4 which is arranged around the polygonal surfaces 3, a pair of side surfaces 5 and a seating surface 6 (a second side surface). The seating surface 6 is formed in a V-shape when viewed in the thickness direction of the insert main body 2 (the vertical direction in FIG. 4 and FIG. 5, the lateral direction in FIG. 6) opposite to the polygonal surfaces 3. Thereby, the polygonal surfaces 3 are formed approximately in a pentagonal shape.

Furthermore, in the insert main body 2, a flat surface which bisects an included angle θ of a V-shape when the seating surface 6 is viewed in the thickness direction is given as a flat surface A, and an intersecting point with a flat surface B orthogonal to the flat surface and positioned at the center in the thickness direction is given as an insert center line C. The insert main body 2 is formed so as to give rotation symmetry at 180° around the insert center line C, that is, it is formed in such a manner that the pair of polygonal surfaces 3 is reversely symmetrical at the front and at the back. Still furthermore, the insert main body 2 is provided with an attachment hole 7 which penetrates between the pair of polygonal surfaces 3 in the thickness direction. The attachment hole 7 is formed in such a manner that the center line thereof is made orthogonal to the insert center line C and opened approximately at the center of the polygonal surfaces 3. There is formed, on the attachment hole 7, a diameter reducing portion 7A which decreases in inner diameter moving toward the center in the thickness direction.

Figure 4:
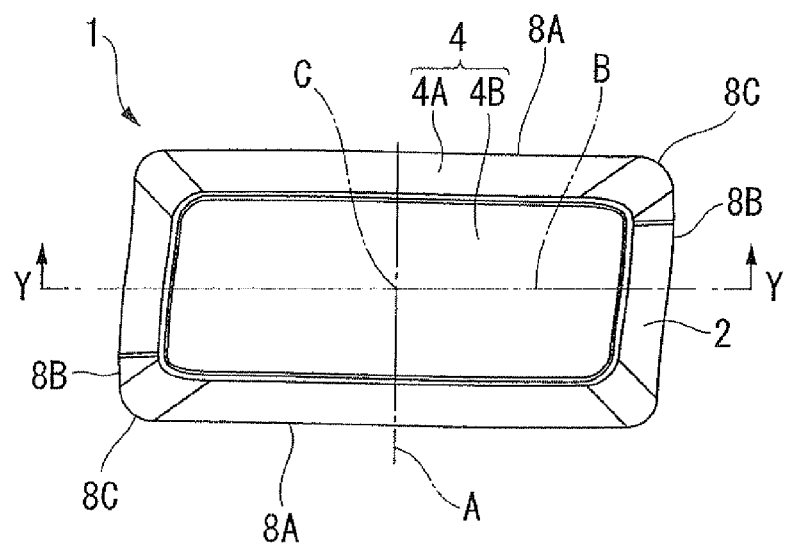
FIG. 4 is a plan view of the embodiment shown in FIG. 1 when viewed from the rake face.
Figure 5:
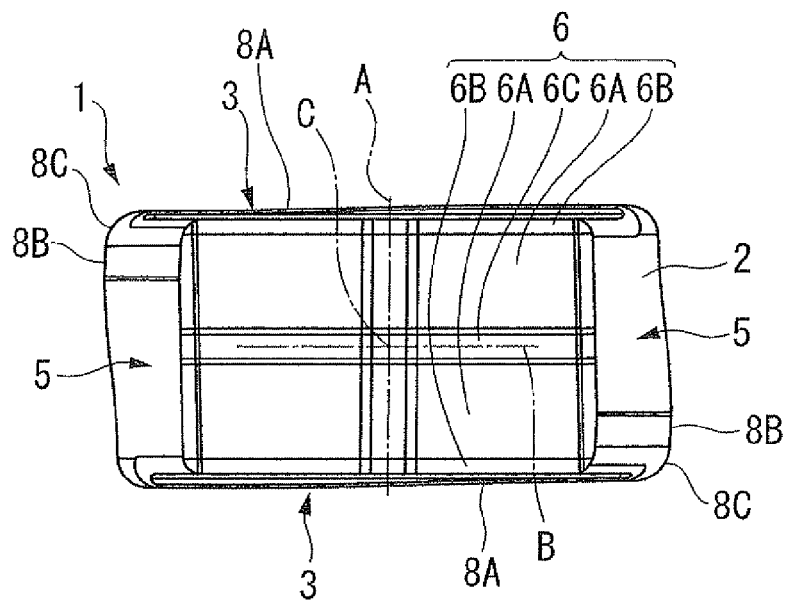
FIG. 5 is a bottom view of the embodiment shown in FIG. 1 when viewed from a seating surface.
Figure 6:
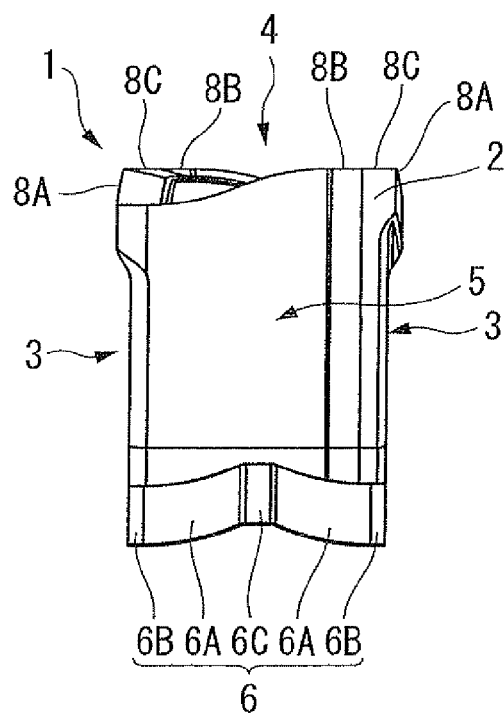
FIG. 6 is a side view of the embodiment shown in FIG. 1 when viewed in a direction opposite to a pair of side surfaces.

As shown in FIG. 4, the rake face 4 is formed approximately in a parallelogram which is chamfered in such a manner that each corner gives externally a raised circular arc. Of four sides of the parallelogram, major cutting edges (a first cutting edge, a second cutting edge) 8A are formed at ridge parts between the rake face 4 and the polygonal surfaces 3. Furthermore, minor cutting edges 8B are formed at ridge parts between the rake face 4 and the side surfaces 5. Still furthermore, at the corners which are chamfered to give a raised circular arc, that is, at acute-angled corners of the parallelogram, there are formed corner edges 8C smoothly continuing to the major cutting edges 8A and the minor cutting edges 8B. Of these cutting edges 8A to 8C, the corner edges 8C project to the greatest extent in the direction of the insert center line C. The major cutting edges 8A and the minor cutting edges 8B give a moderately raised curve shape from the corner edges 8C, thereafter, giving a recessed curve, and going backward in the direction of the insert center line C, thereby continuing respectively to the blunt-angle corners of the parallelogram.

Figure 7:
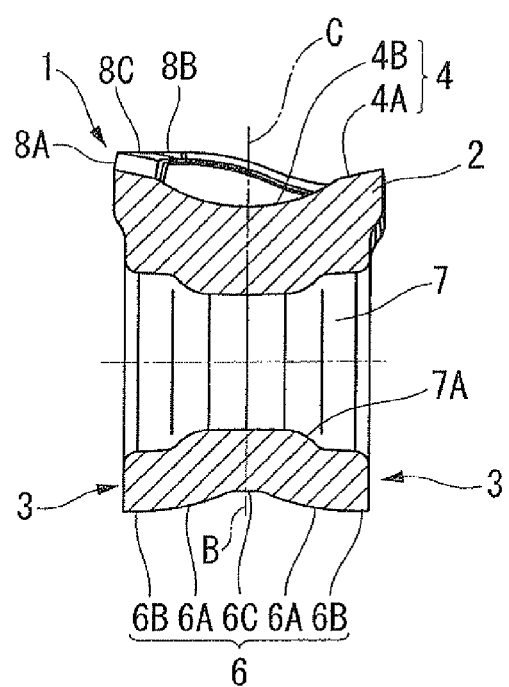
FIG. 7 is a cross sectional view taken along line X to X shown in FIG. 3.
Figure 8:
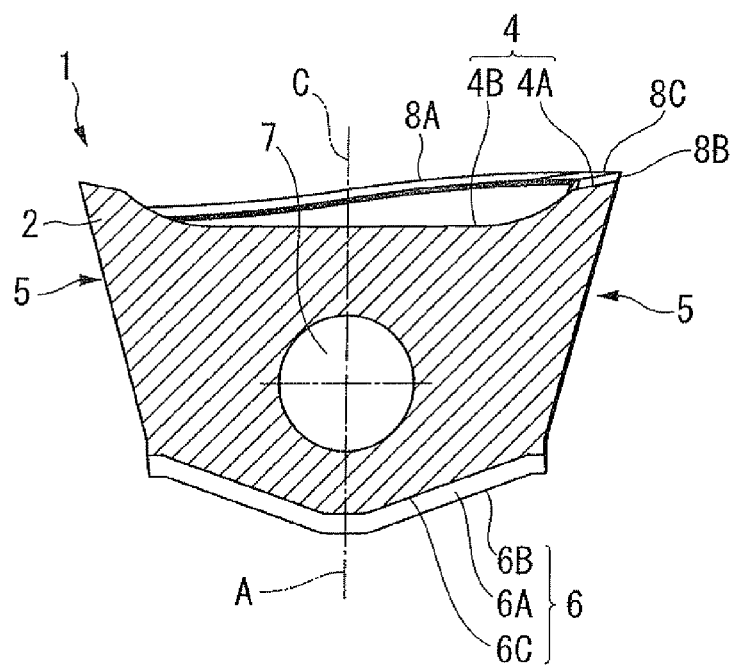
FIG. 8 is a cross sectional view taken along line Y to Y shown in FIG. 4.
Figure 9:
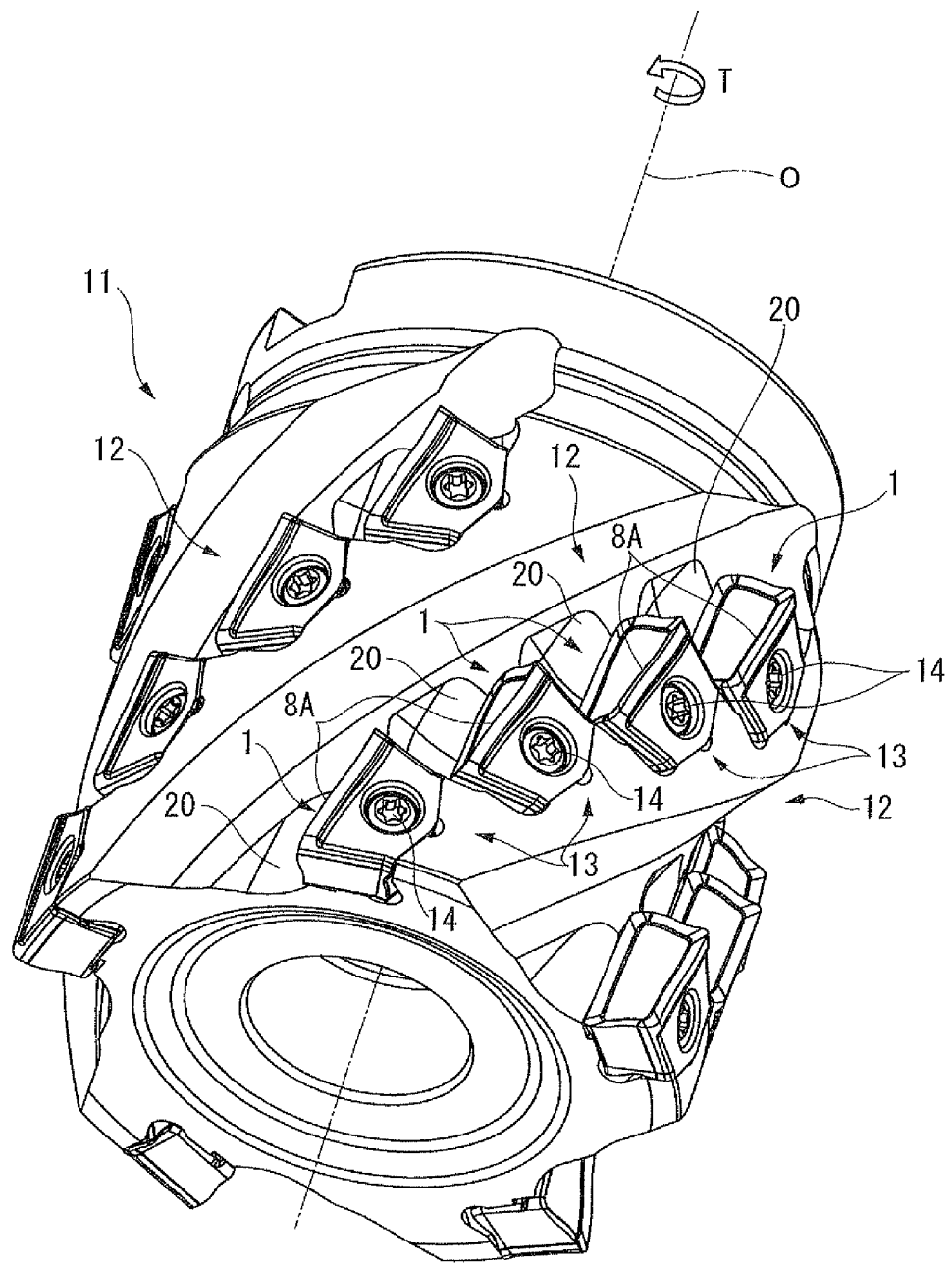
FIG. 9 is a perspective view which shows one embodiment of a removable insert-type cutting tool of the present invention to which the cutting insert of the embodiment shown in the FIG. 1 is attached when viewed from the leading end of the tool main body.
Figure 10:
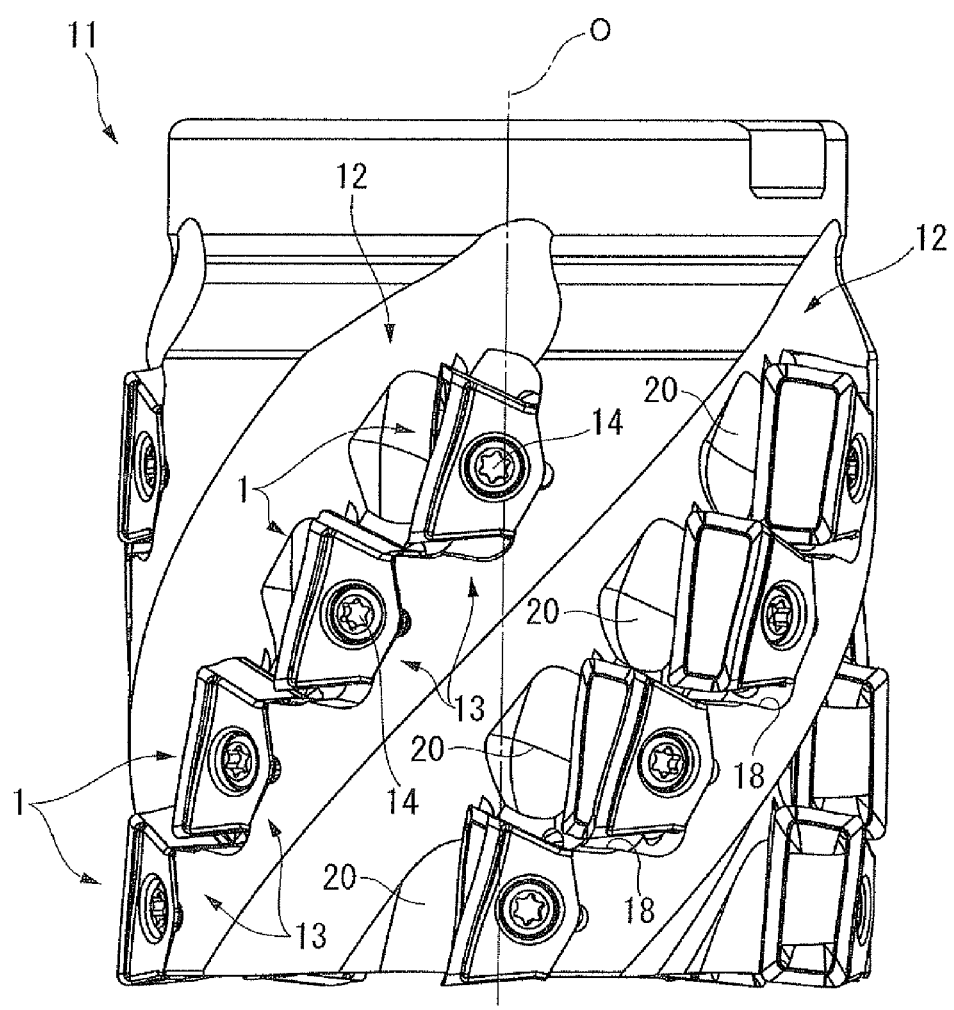
FIG. 10 is a front view of the embodiment shown in FIG. 9.
Figure 11:
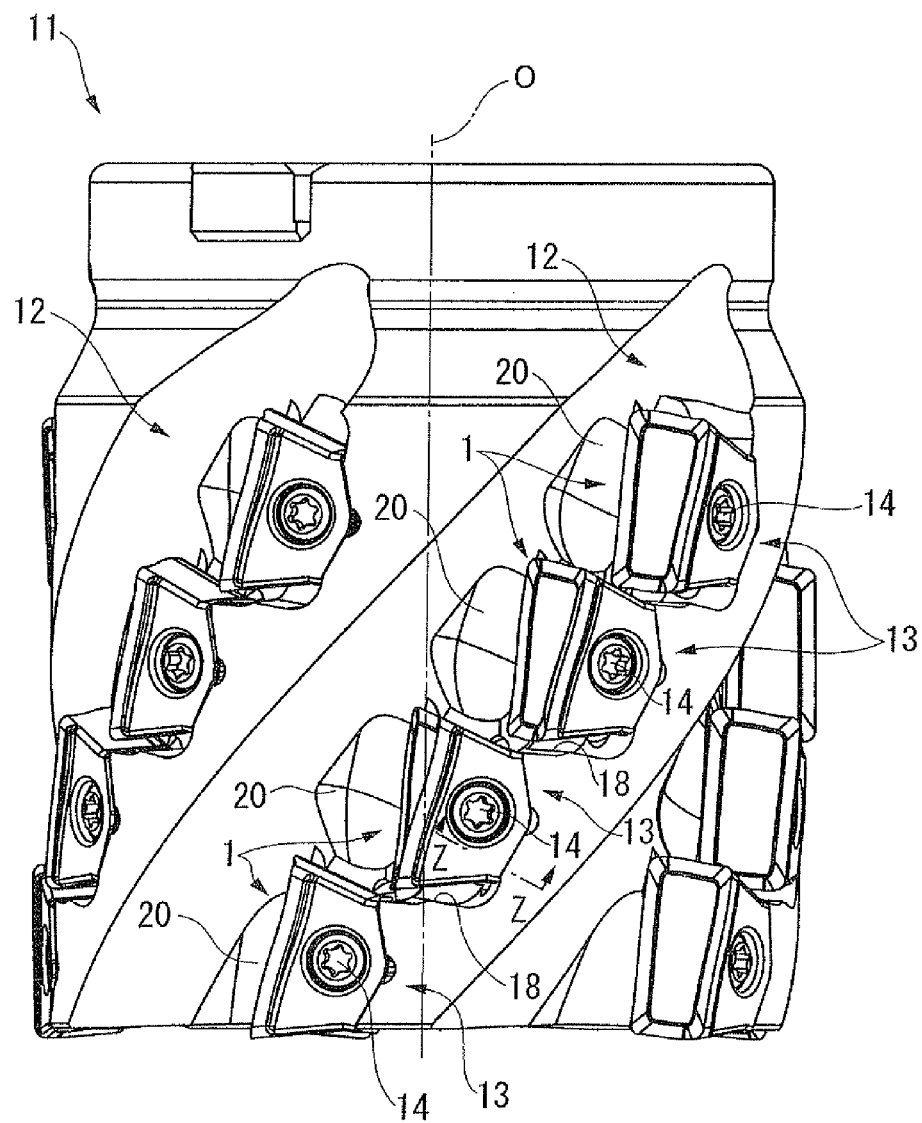
FIG. 11 is a side view of the embodiment shown in FIG. 9.
Figure 12:
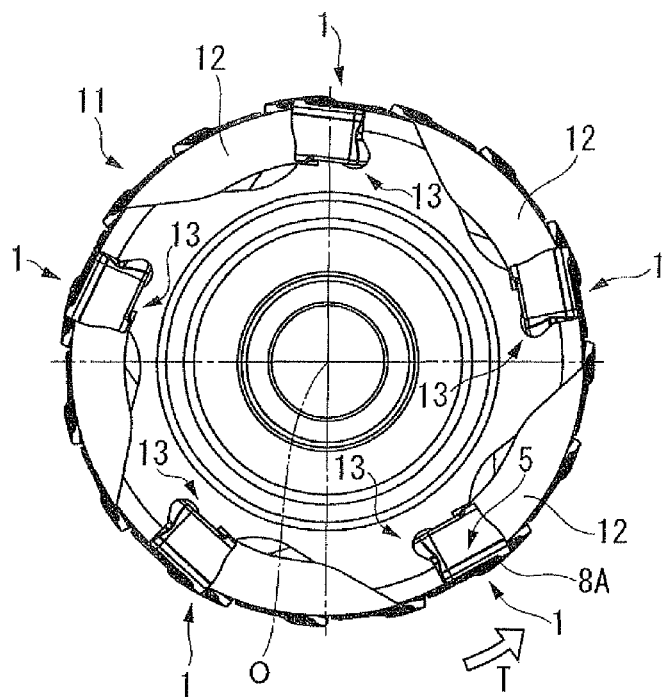
FIG. 12 is a bottom surface of the embodiment shown in FIG. 9 when viewed from the leading end thereof in the axial direction.
Figure 13:
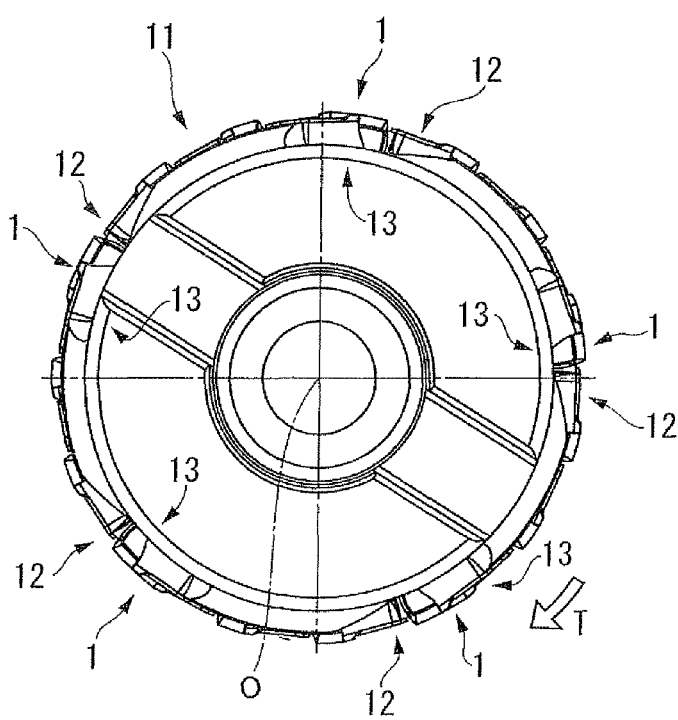
FIG. 13 is a plan view of the embodiment shown in FIG. 9 when viewed from the rear end thereof in the axial direction.

Furthermore, on the rake face 4, there is formed, inside the cutting edges 8A to 80, a positive land 4A which is approximately constant in width. A recessed portion 4B is formed further inside the positive land 4A. As shown in FIG. 7, the bottom surface of the recessed portion 4B is formed so as to give a recessed curve on a cross section along the thickness direction. Still furthermore, as shown in FIG. 8, the bottom surface of the recessed portion 4B is formed on a cross section orthogonal to the thickness direction so as to go backward, while giving a recessed curve from the positive land 4A, thereafter extending straight perpendicularly with respect to the insert center line C.

As shown in FIG. 3, the above-described pair of side surfaces 5 intersects with the rake face 4 at an acute angle and inclines so as to come closer to each other as they approach the seating surface 6. Furthermore, the pair of side surfaces 5 is formed so as to extend parallel to each other slightly before the seating surface 6 and also in parallel with the flat surface A. Still furthermore, in the polygonal surface 3, a border which is adjacent to the rake face 4 approximately constant in width from the major cutting edges 8A projects further in the thickness direction. Regarding the polygonal surface 3, a part closer to the seating surface 6 than the border is formed in a flat surface shape perpendicular in the thickness direction. The attachment hole 7 is opened at the flat surface part of the polygonal surface 3. A ridge part between the pair of polygonal surfaces 3 which continues to each of the raised circular arcs outside the rake face 4 and the side surfaces 5 is formed so as to give an externally raised cylindrical surface.

Figure 15:
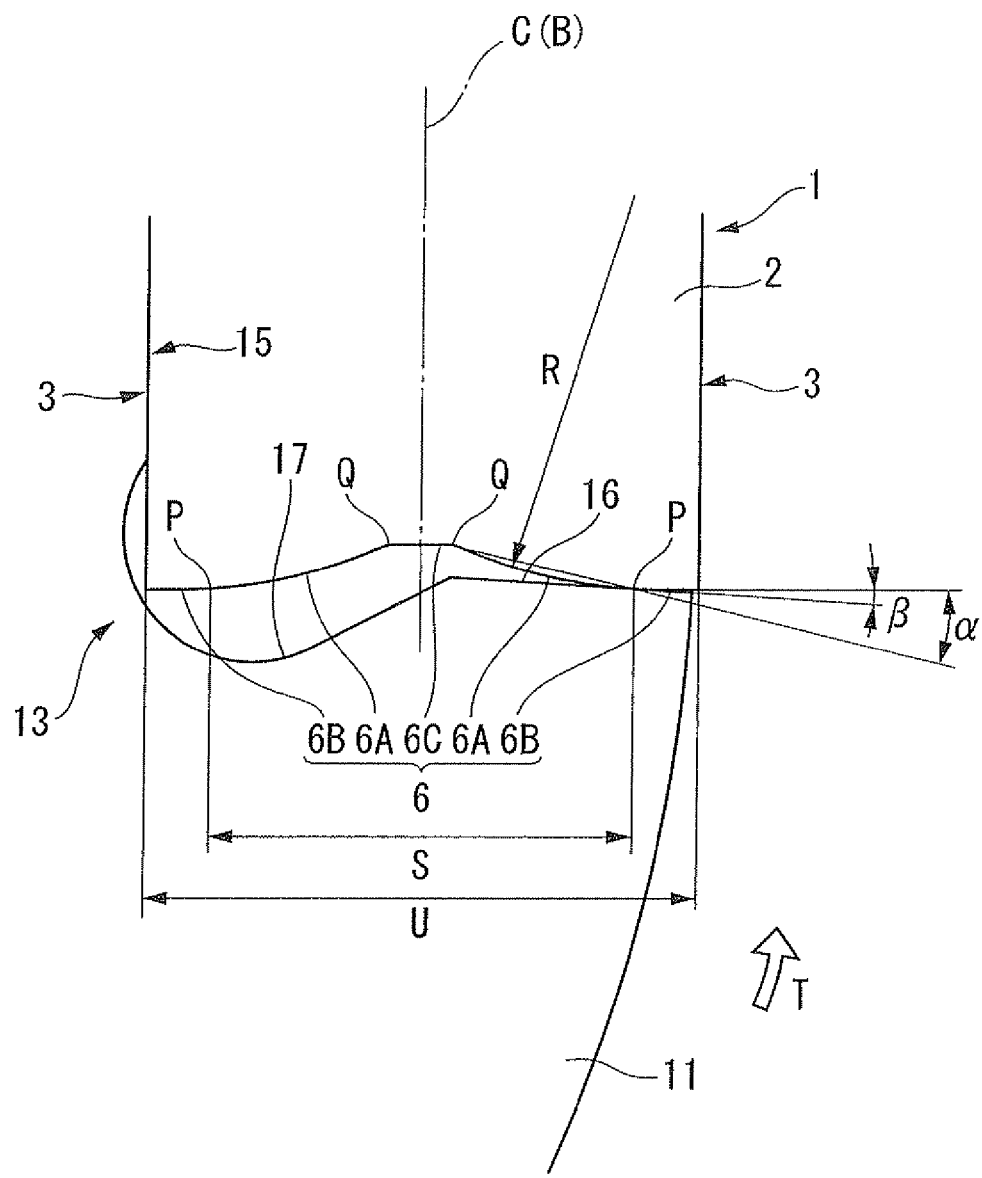
FIG. 15 is a cross sectional view taken along line Z to Z shown in FIG. 11.
Figure 16:
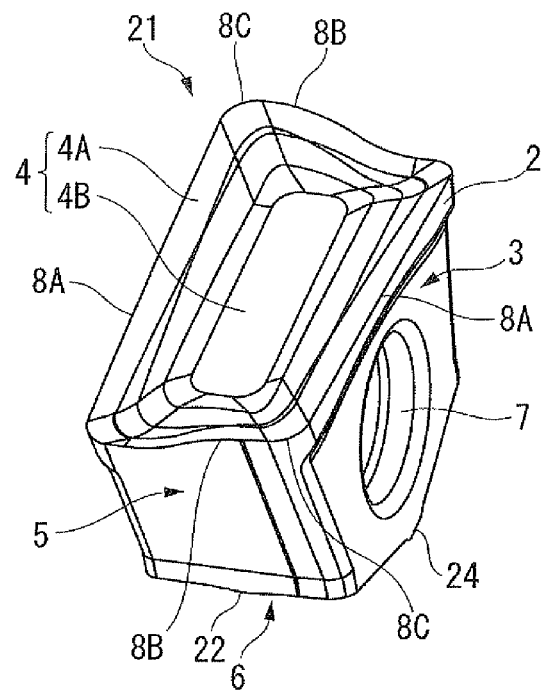
FIG. 16 is a perspective view which shows a second embodiment of the cutting insert of the present invention when viewed from the rake face.
Figure 17:
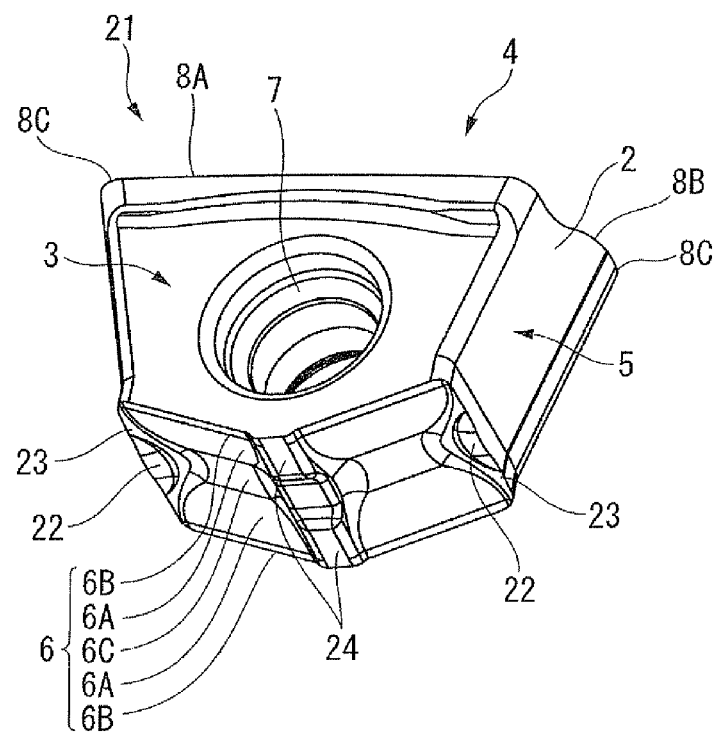
FIG. 17 is a perspective view of the embodiment shown in FIG. 16 when viewed from the seating surface.
Figure 18:
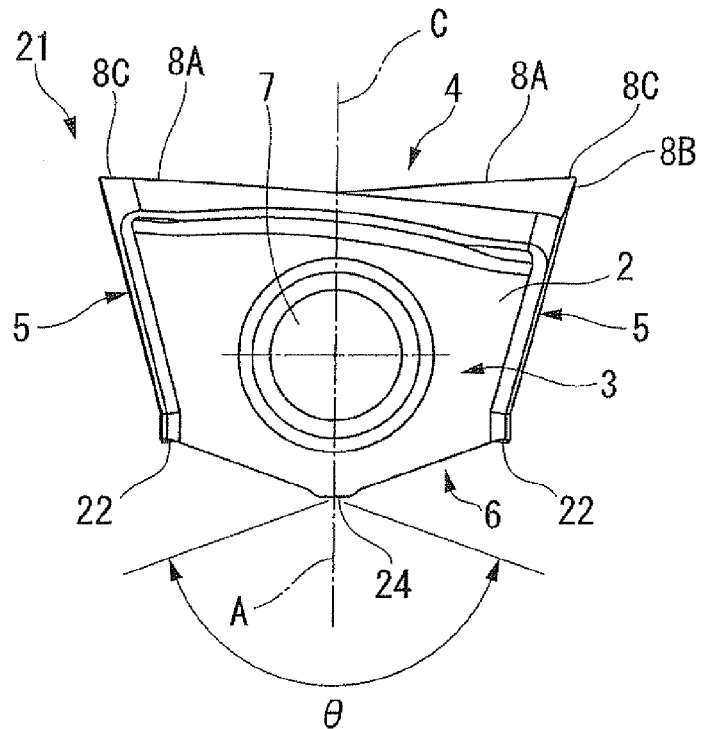
FIG. 18 is a front view of the embodiment shown in FIG. 16 when viewed from the thickness direction of the insert main body opposite to the pair of polygonal surfaces.
Figure 19:
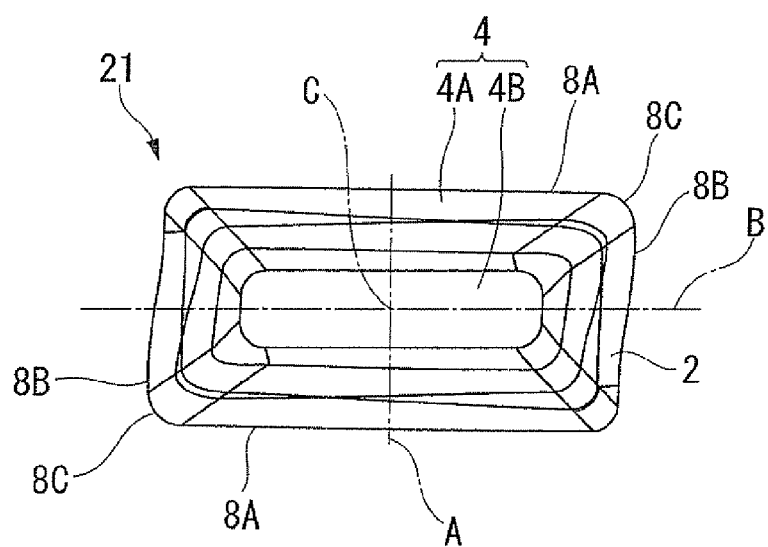
FIG. 19 is a plan view of the embodiment shown in FIG. 16 when viewed from the rake face.
Figure 20:
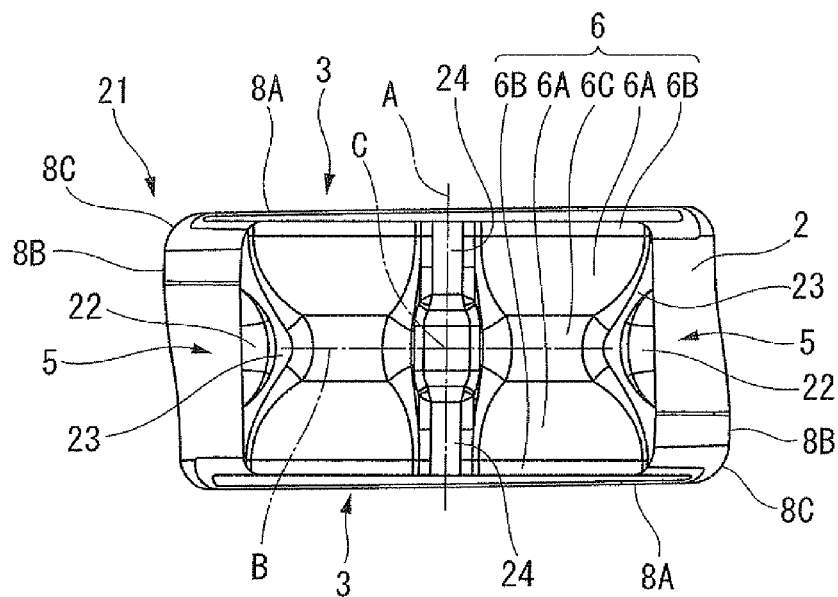
FIG. 20 is a bottom surface of the embodiment shown in FIG. 16 when viewed from the seating surface.
Figure 21:
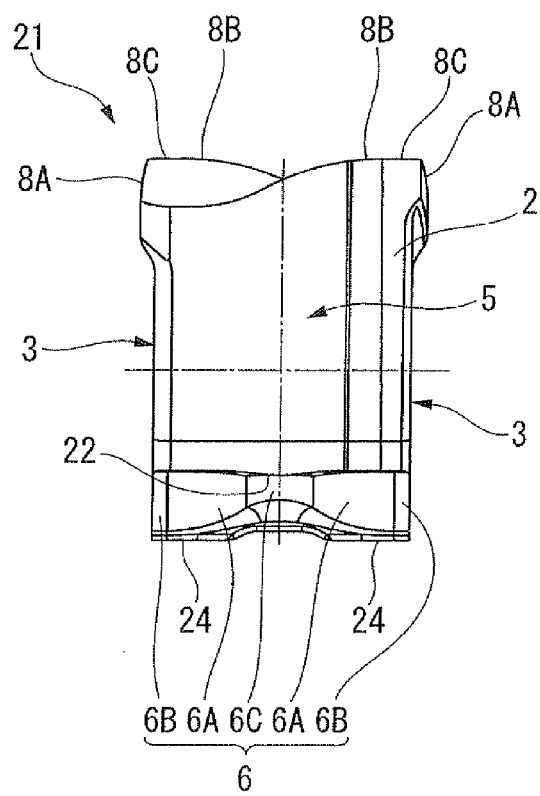
FIG. 21 is a side view of the embodiment shown in FIG. 16 when viewed from a direction opposite to the pair of side surfaces.

Furthermore, as shown in FIG. 3, in the present embodiment, the seating surface 6 is formed so as to assume a V-shape which is raised in the direction of the insert center line C, when viewed in the thickness direction. However, a ridge part between the top of the seating surface 6 formed in the raised V-shape and the inclined surface and a ridge part between the seating surface 6 and the pair of side surfaces 5 extend in a direction perpendicular to the insert center line C when viewed in the thickness direction. Then, the seating surface 6 formed in the raised V-shape when viewed in the thickness direction is formed on a cross section along the thickness direction so as to assume a recessed V-shape which is gradually recessed as it approaches the center in the thickness direction, as shown in FIG. 7 and FIG. 15. The V-shape surface of the seating surface 6 which is formed in a recessed V-shape, that is, a pair of inclined surfaces (a first contact surface, a second contact surface) is formed so as to assume a raised curve shape which swells out on the cross section along the thickness direction, and a pair of contact portions (a first contact portion, and a second contact portion) 6A is formed.

FIG. 15 is a cross sectional view of the seating surface 8 along the thickness direction orthogonal to the V-shape inclined sides raised in the direction of the insert center line C and the polygonal surfaces 3 when viewed in the thickness direction. As shown in FIG. 15, the pair of contact portions 6A is formed so as to give an externally raised circular arc. The contact portion 6A is formed in a cylindrical surface shape constant in radius extending along an inclined side of a ridge part between the seating surface 6 having a raised V-shape in the direction of the insert center line C and the polygonal surface 3. A flat surface 6B which is flat and constant in width, extending straight in the thickness direction on the cross section shown in FIG. 15 is formed on a border adjacent to the polygonal surface 3 of the seating surface 6. A flat surface 6C which is flat and constant in width and extending straight in the thickness direction on the cross section thereof is formed at a recessed V-shape bottom part at the center of the seating surface 6 in the thickness direction. Therefore, the flat surface 6B adjacent to the polygonal surface 3 and the polygonal surface 3 intersect with each other perpendicularly at each inclined side of the ridge part between the seating surface 6 formed in the raised V-shape in the direction of the insert center line C and the polygonal surface 3.

Then, the pair of contact portions 6A is smoothly connected at the contact point (a contact line) P to the flat surface 6B adjacent to the polygonal surface 3 on the cross section shown in FIG. 15. The pair of contact portions 6A is recessed in the direction of the insert center line C, while bending in a raised form as they approach the center in the thickness direction, intersecting with the flat surface 6C at the bottom part of the seating surface 6 at the intersecting point (intersecting line) Q at a blunt angle. In the present embodiment, a circular arc-shape radius R raised in the direction of the insert center line C that the contact portion 6A has on the cross section shown in FIG. 15 is smaller than the thickness U of the insert main body 2 in the vicinity of the seating surface 6 and greater than the clearance S in the thickness direction between the contact points P at the pair of the contact portions 6A on the same cross section. Furthermore, an inclined angle α formed by a straight line connecting the contact point P with the intersecting point Q on the same cross section (a circular arc-shape cord raised in the direction of the insert center line C that the contact portion 6A has) is within a range of 8° to 18°. It is noted that the seating surface 6 is symmetrical respectively to the flat surfaces A and B.

The removable insert-type cutting tool of one embodiment of the present invention to which the above-described cutting insert 1 is attached is provided with a tool main body 11 which rotates in the rotating direction T of the cutting tool around the axis line O. The tool main body 11 is formed externally in an approximately cylindrical shape at the center of the axis line O. A chip removing flute 12 is formed from the leading end of the tool main body 11 to the rear end thereof on an outer circumference surface of the tool main body 11. The chip removing flute 12 is formed so as to be twisted backward in the rotating direction T of the cutting tool around the axis line O, and the plurality of chip removing flutes 12 (five in the present embodiment) are formed in the circumferential direction at a regular interval.

Then, a plurality of insert seats 13 (four each in the present embodiment) are formed so as to be opened on a wall surface of each of the chip removing flutes 12 facing forward in the rotating direction T of the cutting tool. The cutting insert 1 of the above-described embodiment is attached removably to each of the insert seats 13 with a clamp screw 14. That is, the removable insert-type cutting tool of the present embodiment is a milling tool (an end mill or a radius end mill in particular).

Figure 14:
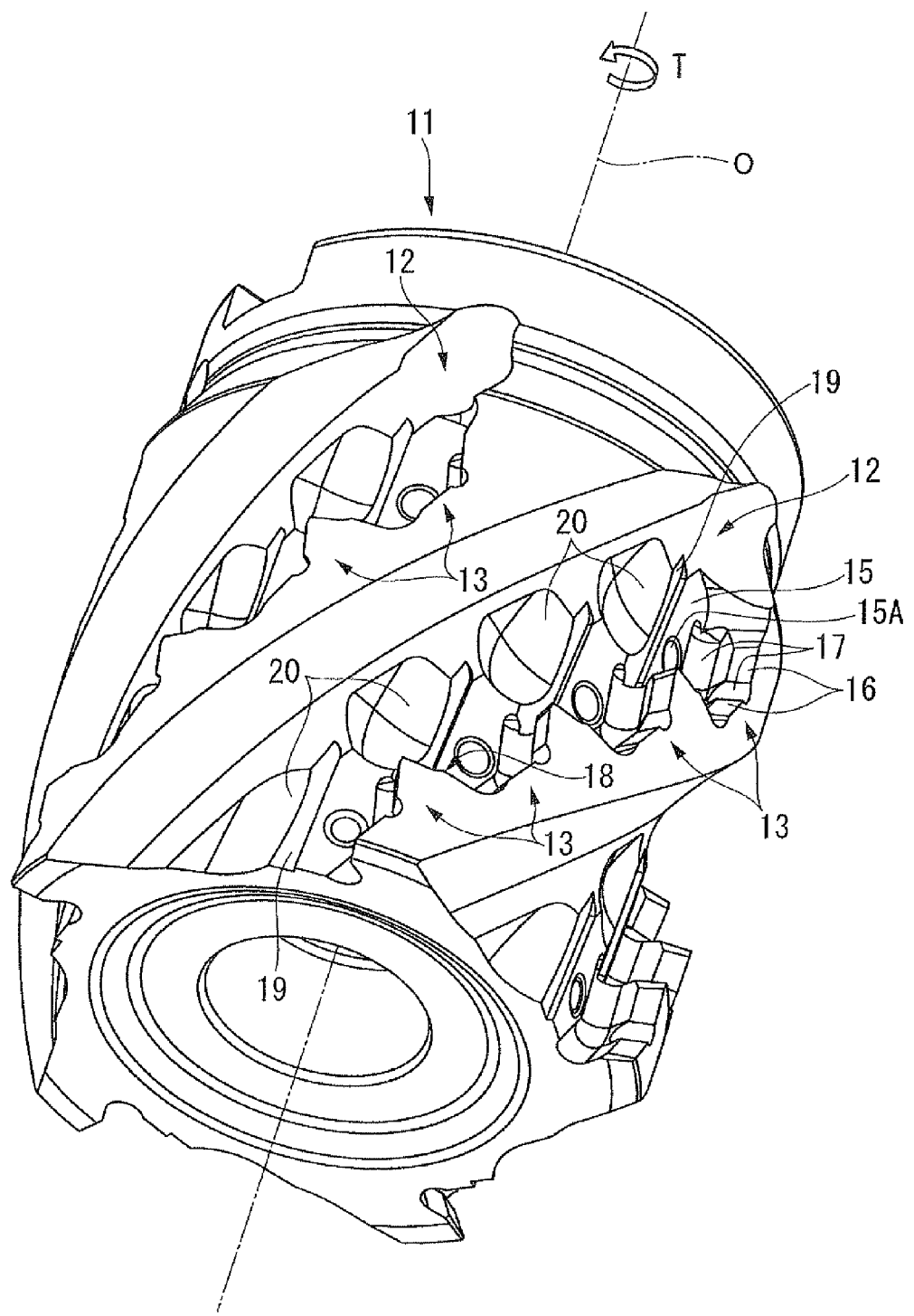
FIG. 14 is a perspective view of the tool main body to which the cutting insert of the embodiment shown in FIG. 9 is not attached when viewed from the leading end of the tool main body.

As shown in FIG. 14, the insert seat 13 is provided with a bottom surface 15 facing outside in the radial direction of the tool main body 11 and wall surfaces 16 facing forward in the rotating direction T of the cutting tool. Of these surfaces, the bottom surface 15 is formed in a flat surface shape and a thread hole 15A is formed approximately at the center thereof. The cutting insert 1 is attached to an insert seat 13 by screwing the clamp screw 14 inserted through the attachment hole 7 of the insert main body 2 into the thread hole 15A. The cutting insert 1 is attached to the insert seat 13 such that a flat-surface part adjacent to the seating surface 6 of one of the polygonal surfaces 3 facing to the bottom surface 15 is in contact with the bottom surface 15.

Furthermore, the wall surfaces 16 are formed in a V-shape which is recessed in the circumferential direction when the tool main body 11 is viewed from outside in the radial direction. That is the wall surfaces 16 are formed in a V-shape which is reverse in a relationship to fit to each other to the raised V-shape of the seating surface 6 of the cutting insert 1 when the cutting insert 1 is viewed from the thickness direction. In other words, in the present embodiment, the wall surfaces 16 are formed in a recessed V-shape, and an included angle of the V-shape wall surfaces 16 is made equal to an included angle θ of the raised V-shape inclined surface of the seating surface 6 of the cutting insert 1. In this instance, the thread hole 15A formed on the bottom surface 15 has the center on a V-shape bisector of the wall surfaces 16. However, the thread hole 15A is arranged in such a manner that, with the seating surface 6 of the cutting insert 1 being in contact with the wall surfaces 16, the center line of the thread hole 15A is made eccentric at a position slightly closer to the wall surfaces 16 than the center line of the attachment hole 7 of the cutting insert 1. Thereby, as described above, when the clamp screw 14 is screwed and the diameter reducing portion 7A of the attachment hole 7 is depressed by the head thereof, the cutting insert 1 is fixed to the insert seat 13 in a state such that the seating surface 6 of the cutting insert 1 is pressed against the wall surfaces 16 of the insert seat 13.

As shown in FIG. 14 and FIG. 15, the wall surfaces 18 are formed only outside the tool main body 11 in the radial direction so as to separate from the bottom surface 15, A groove-like relief part 17 is formed between the bottom surface 15 and the wall surfaces 16. The relief part 17 also extends to a position opposite to a recessed V-shape bottom part of the wall surfaces 16. FIG. 15 is a cross sectional view along a direction orthogonal to the recessed V-shape inclined side of the wall surface 16 and the bottom surface 15. As shown in FIG. 15, the wall surface 16 is formed in a flat surface shape so as to slightly incline backward in the rotating direction T of the cutting tool main body, as it moves outside in the radial direction of the tool main body 1 with respect to a perpendicular line of the bottom surface 15 of the insert seat 13. An inclined angle β of the wall surfaces 16 with respect to the perpendicular line of the bottom surface 15 is smaller than the inclined angle α at the contact portion 6A of the cutting insert 1 in the present embodiment.

The depth of the insert seat 13 perpendicularly from the bottom surface 15 to an outer circumference surface of the tool main body 11 is, as shown in FIG. 15, slightly smaller than the thickness U of the seating surface 6 of the insert main body 2. Furthermore, the wall surface 16 is smaller in width in the thickness direction than half the thickness U of the insert main body 2 and greater than half the clearance S. The wall surface 16 is constant in width and formed so as to extend along each of the recessed V-shape inclined sides.

The plurality of insert seats 13 are formed for each of the chip removing flutes 12 on the tool main body 11. The wall surfaces 18 of the individual insert seats 13 are arrayed so as to assume a shape of helical stairs along the twisted chip removing flute 12. That is, with respect to the wall surface 16 of an insert seat 13 at the leading end, the wall surface 16 of a next insert seat 13 adjacent to the rear end thereof is arranged so as to be deviated by one step backward in the rotating direction T of the cutting tool.

Therefore, a step surface 18 extending in the circumferential direction of the tool main body 11 is formed between the wall surfaces 16 of adjacent insert seats 13 on one chip removing flute 12. The side surface 5 of the cutting insert 1 attached to the insert seat 13 which faces to the leading end of the tool main body 11 is arranged so as to be opposite to the step surface 18. However, in the present embodiment, the side surface 5 of the thus attached cutting insert 1 is arranged close to the step surface 18 so as not to be in contact therewith.

In the rotating direction T of the cutting tool further forward than the bottom surface 15 of each of the insert seats 13, there is formed a relief part 19 which accommodates a part of the rake face 4 projecting further than the flat surface part of the polygonal surface 3 closely attached to the bottom surface 15. On the bottom surface of the chip removing flute 12 facing outside in the radial direction of the tool main body 11 in the rotating direction T of the cutting tool further forward than the relief part 19, there is formed a recess 20 so as to be further recessed than the bottom surface. The recess 20 is recessed so as to give a smooth recessed curve on a cross section along the circumferential direction of the tool main body 11 and also on a cross section along the direction of the axis line O. Furthermore, the recesses 20 are respectively formed at the insert seats 13 at intervals so as to be positioned forward in the rotating direction T of the cutting tool.

The cutting insert 1 is fixed to the insert seat 13 of the tool main body 11 by screwing the clamp screw 14 into the thread hole 15A, as described above. The cutting insert 1 is attached to the insert seat 13 in a state that a flat surface part of one of the polygonal surfaces 3 of the insert main body 2 is closely attached to the bottom surface 15. Furthermore, the cutting insert 1 is attached in a state that the seating surface 6 having a raised V-shape is in contact with the wall surfaces 16 formed in a recessed V-shape reverse in a relationship to fit to each other and depressed. In this instance, the relief part 17 is formed between the bottom surface 15 of the insert seat 13 and the wall surface 16 thereof. Therefore, of the pair of contact portions 6A on the seating surface 6 whose cross sectional shape along the thickness direction is a recessed V-shape, only the contact portion 6A more distant from the bottom surface 15 of the insert seat 13 is in contact with the wall surfaces 16 of the insert seat 13.

As described above, in the cutting insert 1 and the removable insert-type cutting tool of the present embodiment, the polygonal surface 3 is closely attached to the bottom surface 15. Furthermore, the seating surface 6 is fitted into and in contact with the wall surfaces 16 formed in a V-shape reverse in a relationship to fit to each other. Still furthermore, with regard to the seating surface 6, the contact portion 6A more distant from one of the polygonal surfaces 3 closely attached to the bottom surface 15 is in contact with the wall surfaces 16 of the insert seat 13. Thereby, it is possible to attach the cutting insert 1 to the insert seat 13 stably and firmly. That is, as described above, the seating surface 6 is in contact with the wall surfaces 16 formed in a V-shape reverse in a relationship to fit to each other, by which the cutting insert 1 is positioned in the direction of the axis line O of the tool main body 11 and maintained stable. In addition, the contact portion 6A and the wall surfaces 16 in contact with each other are spaced away from the polygonal surface 3 and the bottom surface 15 which are closely attached to each other. It is, therefore, possible to attach the cutting insert 1 stably and firmly in the radial direction of the tool main body 11.

Then, the contact portion 6A is formed so as to swell out in a raised curve shape whose cross sectional shape is a raised circular arc. Therefore, even if an error is found at the contact portion 6A due to dimensional allowance on formation of the insert main body 2 and any change is found, for example, in inclined angle α of a circular arc-shaped chord of the contact portion 8A, the raised curve of the contact portion 6A itself only moves in the curved direction (the circumferential direction of the raised circular arc). As a result, there is no great change in position in contact with the wall surfaces 16. It is, therefore, possible to prevent influences of the dimensional allowance on the posture, accuracy and stability on attachment of the cutting insert 1 to the insert seat 13. Thus, according to the above-constituted cutting insert 1, even when a non-polished product obtained by just sintering a hard sintered body such as cemented carbide is used as the insert main body 2, highly accurate and stable cutting machining can be performed.

Furthermore, in the present embodiment, the wall surfaces 16 of insert seat 13 are formed as an inclined surface which inclines backward in the rotating direction T of the cutting tool as they move outside in the radial direction of the tool main body 11 with respect to a direction perpendicular to the bottom surface 15. Still furthermore, an inclined angle β formed in a direction perpendicular to the bottom surface 15 of the wall surfaces 16 is made smaller than an inclined angle α formed in a direction perpendicular to one of the polygonal surfaces 3 by a raised circular-arc chord on the cross section of the contact portion 6A of the cutting insert 1. Therefore, of the contact portions 6A each of which has the raised circular arc, the contact portion 6A away from the bottom surface 15 and the polygonal surface 3 which are closely attached to each other is in contact with the wall surfaces 16 at a position close to the contact point P outside in the radial direction of the tool main body 11. As a result, it is possible to attach the cutting insert 1 more stably and more securely in the radial direction of the tool main body 11.

Furthermore, the removable insert-type cutting tool of the present embodiment is a tool for milling machining in which a plurality of insert seats 13 are formed in the direction of the axis line O and each of the insert seats 13 is provided with the cutting insert 1. Then, the major cutting edges 6A facing outside in the radial direction of the tool main body 11 of the cutting inserts 1 at rotating loci around the axis line O are formed so as to form a vertical wall or the like in continuation with respect to a workpiece in the direction of the axis line O. Still furthermore, in each of the cutting inserts 1, one of the polygonal surfaces 3 and the seating surface 6 are in contact with the insert seat 13. That is, in the cutting insert 1, one of the polygonal surfaces 3 is closely attached to the bottom surface 15 of the insert seat 13, and the seating surface 6 positioned on the opposite side of the rake face 4 via a pair of side surfaces 5 is in contact with the wall surfaces 16 of the insert seat 13. Therefore, it is possible to avoid interference of the side surfaces 5 on attachment of the cutting insert 1 and also to secure the strength, rigidity, accuracy and stability on attachment of the cutting insert 1.

Therefore, there is eliminated a necessity for forming the wall surfaces in contact with the side surface 5 on the insert seat 13. Furthermore, it is not necessary to secure the thickness of the tool main body 11 between the wall surfaces in adjacent insert seats 13 in the direction of the axis line O. As a result, it is not necessary to maintain a clearance between the insert seats 13. Thereby, the insert seat 13 can be formed so as to come closer in the direction of the axis line O as much as possible. Thus, it is possible to increase the number of cutting inserts 1 which can be attached to the insert seats 13 formed along one chip removing flute 12. It is also possible to arrange the cutting inserts 1 by overlapping the rotating loci of the major cutting edges 8A in the direction of the axis line O so that the rotating loci of the major cutting edges 8A can continue only with these cutting inserts 1. Therefore, milling machining can be performed more efficiently. This is in particular effective in the case of an insert removable-type milling tool having a long cutting edge in which continuous rotating loci of the major cutting edges 8A are long in the direction of the axis line O.

Furthermore, in the removable insert-type cutting tool of the present embodiment, the wall surfaces 16 of the insert seat 13 with which the seating surface 6 is in contact are not arrayed so as to be twisted along the twisted chip removing flute 12. That is, a recessed V-shape bisector of the wall surfaces 16 is not arranged so as to be orthogonal to the twisted chip removing flute 12. In other words, in the removable insert-type cutting tool of the present embodiment, a step surface 18 extending in the circumferential direction of the tool main body 11 is formed between the wall surfaces 16 of adjacent insert seats 13. Then, the wall surfaces 16 of the insert seat 13 are formed in the shape of helical stairs in accordance with the twisted chip removing flute 12 via the step surface 18. The cutting insert 1 attached to each of the insert seats 13 is provided with the insert main body 2 equal in shape and dimension. Therefore, the rake face 4 facing forward in the rotating direction T of the cutting tool is arranged to assume a shape of helical stairs having a step along the twisted chip removing flute 12. The rake face 4 of the cutting insert 1 is provided on the opposite side of the insert main body 2 from the seating surface 6 in contact with the wall surfaces 16 of the insert seat 13.

Therefore, a great space is provided by the step forward in the rotating direction T of the cutting tool on the rake face 4 of each cutting insert 1 excluding the cutting insert 1 at the most leading end. This space is formed between the rake face 4 of the cutting inset 1 and the rear end of the side surface 5 of the adjacent insert 1 (backward in the rotating direction T of the cutting tool) facing to the rearward of the tool main body 11 in the direction of the axis line O. When a workplace is subjected to milling machining by using the removable insert-type cutting tool, chips generated by each of the major cutting edges 8A of the cutting insert 1 can be accommodated at the space and discharged. Therefore, there is no chance that the chips generated by the major cutting edges 8A will be entangled and clogged inside the chip removing flute 12. As a result, it is possible to smoothly discharge the chips and also perform milling machining more efficiently. Regarding the wall surfaces 16 of the insert seat 13 which are thus formed so as to assume a shape of helical stairs and the rake face 4 of the cutting insert 1, those adjacent in the direction of the axis line O may be spaced evenly (with an equal clearance) as with the present embodiment or may be spaced unevenly.

Furthermore, in the present embodiment, the recess 20 which is further recessed from the bottom surface 12 is formed on the bottom surface of the chip removing flute 12 forward in the rotating direction T of the cutting tool in each of the insert seats 13. The recess 20 is formed independently for each of the insert seats 13, that is, the recess 20 is formed so as to give a curve in which an opening border on the bottom surface of the chip removing flute 12 is closed at intervals with each other. Therefore, as described above, the space formed on the rake face 4 of each of the cutting inserts 1 can be securely increased. It is, thereby, possible to discharge chips more efficiently. Furthermore, no chip will flow into other adjacent recesses 20. Still furthermore, the bottom surface of the recess 20 whose cross section is formed in a recessed curve can be used to slightly curl the chips and efficiently discharge the chips.

In the above-described cutting insert 1, if the included angle θ of the V-shape seating surface 6 when viewed in the thickness direction of the insert main body 2 is excessively great, an included angle of the V-shape wall surfaces 16 of the insert seat 13 reverse in a relationship to fit to each other when viewed in the radial direction of the tool main body 11 is made great accordingly. Then, the contact portion 6A of the seating surface 6 in contact with the wall surfaces 16 of the insert seat 13 is easily deviated along the V-shape, by which the stability may be diminished. On the other hand, if the V-shape included angle θ is excessively small, for example, the wall surfaces 16 of adjacent insert seats 13 are not arranged to assume a shape of helical stairs as described above but arranged in close proximity in the circumferential direction, there is a possibility that the thickness between the wall surfaces 16 will not be secured. Therefore, the included angle θ is preferably within a range of 90° to 150°.

Furthermore, in the cutting insert 1 of the present embodiment, the V-shape of the seating surface 6 is a V-shape which is raised in the direction of the insert center line C, while the V-shape of the wall surfaces 16 is a recessed V-shape. Alternatively, the seating surface 6 of the cutting insert 1 has a recessed V-shape when viewed in the thickness direction, and the wall surfaces 16 of the insert seat 13 are formed so as to have a V-shape which is raised outside and with which the seating surface 6 can be in contact. However, it is noted that particularly in the present embodiment, where the cutting insert is attached using the clamp screw 14 inserted through the attachment hole 7, it is necessary to sufficiently secure the thickness of the insert main body 2 between the attachment hole 7 and the seating surface 6. Where the seating surface 6 is formed in a recessed V-shape when viewed from above in the thickness direction, the above-described thickness is set between the bottom part of the seating surface 6 and the attachment hole 7. As a result, there is a possibility that the thickness of a ridge part between the seating surface 6 and the side surface 5 will become unnecessarily great. Thus, when the attachment hole 7 is made on the insert main body 2, the seating surface 6 is preferably formed in a raised V-shape when viewed from above in the thickness direction.

In the present embodiment, a description has been made for a case where the removable insert-type cutting tool is a tool for milling machining which is used for the vertical wall or the like of a workpiece. More specifically, as described above, a description has been made for a case where the plurality of insert seats 13 are formed on the chip removing flute 12 of the tool main body 11 whose external shape is cylindrical and the bottom surface 15 of the insert seat 13 is formed so as to face outside in the radial direction of the tool main body 11. However, even with regard to the same type of milling tool, the present invention is applicable to a side cutter or the like in which a recessed groove is formed on a workpiece. The present invention is applicable, for example, to a side cutter in which insert seats 13, each of which has a bottom surface 15 facing outside in the radial direction, are alternately formed on both circular plate surfaces in the circumferential direction on a circumferential surface of a circular plate-like tool main body. The present invention is also applicable to a side cutter where insert seats 13, each of which has a bottom surface 15 facing in the axial direction, are alternately formed on both circular plate surfaces in the circumferential direction on the outer circumferences of both circular plate surfaces of a circular plate-like tool main body. Furthermore, the cutting insert of the present invention is applicable to a turning tool such as an insert removable bite in addition to the above-described milling tool.

Figure 22:
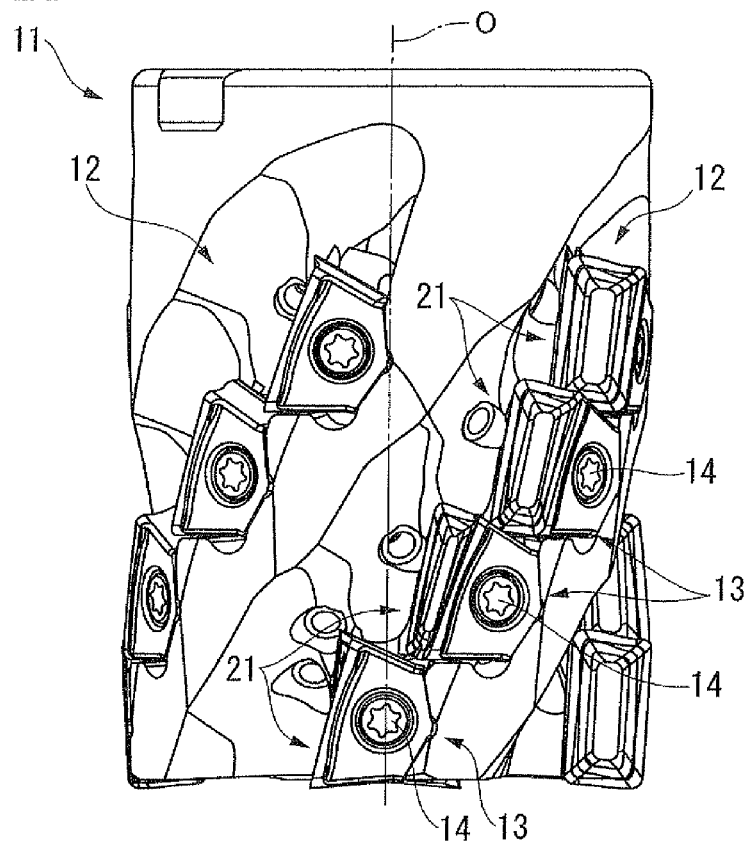
FIG. 22 is a side view which shows the second embodiment of the removable insert-type cutting tool of the present invention to which the cutting insert of the embodiment shown in FIG. 16 is attached.
Figure 23:
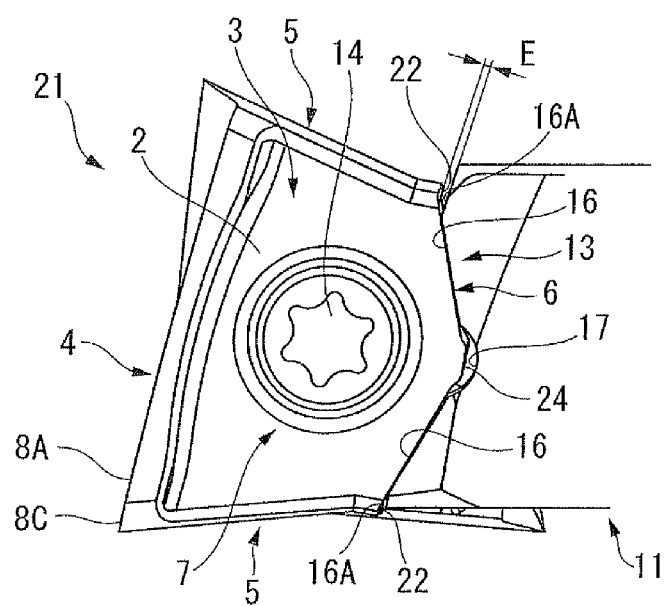
FIG. 23 is an enlarged side view which shows a periphery of the insert seat of the embodiment shown in FIG. 22.

FIG. 16 to FIG. 21 show a second embodiment of the cutting insert of the present invention. FIG. 22 and FIG. 23 also show a second embodiment of the removable insert-type cutting tool of the present invention to which the cuffing insert of the second embodiment is attached. Parts common to the cutting insert 1 of the first embodiment and the removable insert-type cutting tool shown in FIG. 1 to FIG. 15 are given the same reference numerals and a description thereof is omitted here. A cutting insert 21 of the second embodiment is first provided with a projection 22 formed so as to project from a seating surface 6 on both ends of the seating surface 6 in a V-shape when the seating surface 6 is viewed in the thickness direction.

That is, in the present embodiment, there is formed a flat surface portion 23 extending in a direction perpendicular to the insert center line C when viewed in the thickness direction of the cutting insert 21 on the seating surface 6 at a ridge part between the seating surface 6 formed in a raised V-shape in the direction of the insert center line C when viewed in the thickness direction of the cutting insert 21 and a pair of side surfaces 5. Each of the projections 22 is formed at the flat surface portion 23 so as to project in a direction at which the V-shape is raised when viewed in the thickness direction of the seating surface 6. Here, in the present embodiment, each of the projections 22 is formed in such a manner that a surface facing to the projecting direction is formed in a raised curved surface shape such as a sphere made flat in the direction of the insert center line C. Furthermore, the projection 22 is positioned at the center of the flat surface portion 23 in the thickness direction.

Then, these projections 22 gradually project moving toward the center, that is, to the flat surface B respectively from the both sides in the thickness direction. The projections 22 also project gradually in a direction moving from the top of the raised V-shape of the seating surface 6 when viewed in the thickness direction to each of the side surfaces 5. Each of the projections 22 is adjacent to a part in parallel with the flat surface A formed in the vicinity of the seating surface 6 of the side surface 5. Therefore, these projections 22 project to the greatest extent on an intersecting line of the flat surface B with a part in parallel with the flat surface A in the vicinity of the seating surface 6 of the side surface 5. However, the height projecting from the flat surface portion 23 of the projection 22 is sufficiently smaller than the projecting height of the top of the seating surface 6 formed in a V-shape.

Furthermore, in the present embodiment, as described above, a pair of raised portions 24 is also formed at the top of the seating surface 6 having a raised V-shape when viewed in the thickness direction. The pair of raised portions 24 is formed so as to project further in a direction at which the V-shape is raised when viewed in the thickness direction of the seating surface 6. These raised portions 24 are arranged on both sides in the thickness direction at the top of the seating surface 6 at a predetermined interval, and formed so as to extend from the pair of polygonal surfaces 3 to the inside in the thickness direction. In the raised portion 24, a cross section in parallel with the flat surface B is formed in an isosceles trapezoid made flat in the direction of the insert center line C. The top surface of the raised portion 24 is to be positioned on one flat surface perpendicular to the insert center line C. The projection 22 is positioned between the pair of raised portions 24 in the thickness direction.

In the removable insert-type cutting tool of the second embodiment of the present invention to which the cutting insert 21 of the second embodiment is attached, as shown in FIG. 23, a flat surface-shape contacted portion 16A extending in a direction perpendicular to the recessed V-shape bisector is formed at both ends of the recessed V-shape wall surfaces 16 of the insert seat 13. When the cutting insert 21 is attached to the insert seat 13, with the insert center line C being in agreement with a bisector of the recessed V-shape wall surfaces 16, each of the contacted portions 16A is provided with a gap E between itself and the projection 22 within a range of 0.1 mm to 0.3 mm. Furthermore, the pair of raised portions 24 is accommodated into a relief part 17 at the bottom part of the recessed V-shape wall surfaces 16.

According the thus constituted cutting insert 21 of the second embodiment, first, the cutting insert can be seated more stably with the projections 22. For example, there is a case where, clue to dimensional allowance of the insert main body 2 or an error, a V-shape included angle θ of the seating surface 6 is smaller than an included angle of the wall surfaces 16 formed in a V-shape reverse in a relationship to fit to each other to the seating surface 6 in the insert seat 13 of the tool main body 11. Then, there is a possibility that the cutting insert 21 will incline on attachment to the insert seat 13. Even in this case, of the projections 22 formed at both ends of the seating surface 6, the projection 22 formed on the side where the cutting insert 21 inclines is in contact with the contacted portion 16A of the insert seat 13 so as to fill the gap E. Then, the projection 22 is in contact with the contacted portion 16A, the contact portion 6A formed on an inclined surface on the opposite side of the projection 22 in contact with the contacted portion 16A of the seating surface 6 is in contact with the wall surfaces 16, and the polygonal surface 3 is closely attached to the bottom surface 15, by which stable seating property can be obtained.

Furthermore, in the projection 22 of the present embodiment, the surface thereof is formed so as to assume a raised curved surface shape such as a sphere. Therefore, there are obtained effects similar to those obtained when the contact portion 6A of the seating surface 6 whose cross sectional shape along the thickness direction of the insert main body 2 is formed in a raised curve shape is in contact with the flat wall surfaces 16 of the insert seat 13. That is, even where an error or the like resulting from dimensional allowance is found at the projection 22 itself, it is possible to secure the seating stability more reliably by preventing influences on the posture, accuracy and stability on attachment to the insert seat 13.

In the present embodiment, the pair of raised portions 24 is provided also at the top of the seating surface 8 formed in a raised V-shape, at a predetermined interval in the thickness direction of the cutting insert 21, in addition to the projections 22 at both ends of the seating surface 6. Then, the projection 22 is positioned between these raised portions 24 in the thickness direction of the cutting insert 21. Thereby, the raised portions 24 are accommodated into the relief part 17 of the insert seat 13 on attachment of the cutting insert 21 and will not influence the seating property. However, when the cutting insert 21 is made with a hard sintered body such as cemented carbide as described above, the raised portions 24 contribute to the improvement in accuracy on sintering a compressed powder body formed with raw material powder.

On sintering the above-described compressed powder body, the compressed powder body is placed on a flat sintering plate, accommodated into a sintering furnace and heated to conduct sintering. In this instance, in the cutting insert 21, the compressed powder body can be placed on the sintering plate at three supporting points, that is, one of the pair of projections 22 and the pair of raised portions 24 on the compressed powder body. Therefore, the major cutting edge 8A on the rake face 4 which should be accurate after sintering, the minor cutting edge 8B, the corner edge 8C and the contact portion 6A of the seating surface 6 can be subjected to highly accurate sintering by placing the compressed powder body stably without being in contact with the sintering plate. Thus, as described above, even if the cutting insert 21 is a non-polished hard sintered body obtained by being just sintered, highly accurate cutting machining can be performed.

Figure 24:
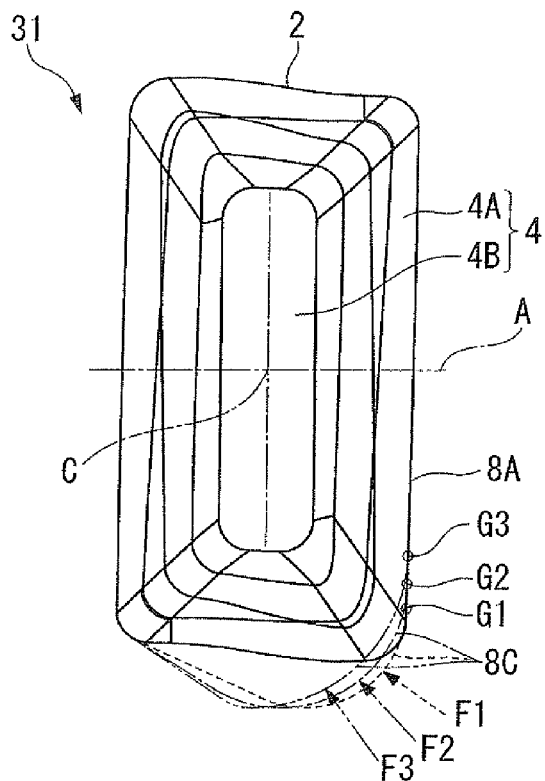
FIG. 24 is a plan view which explains a modified example of the cutting insert of the second embodiment.
Figure 25:
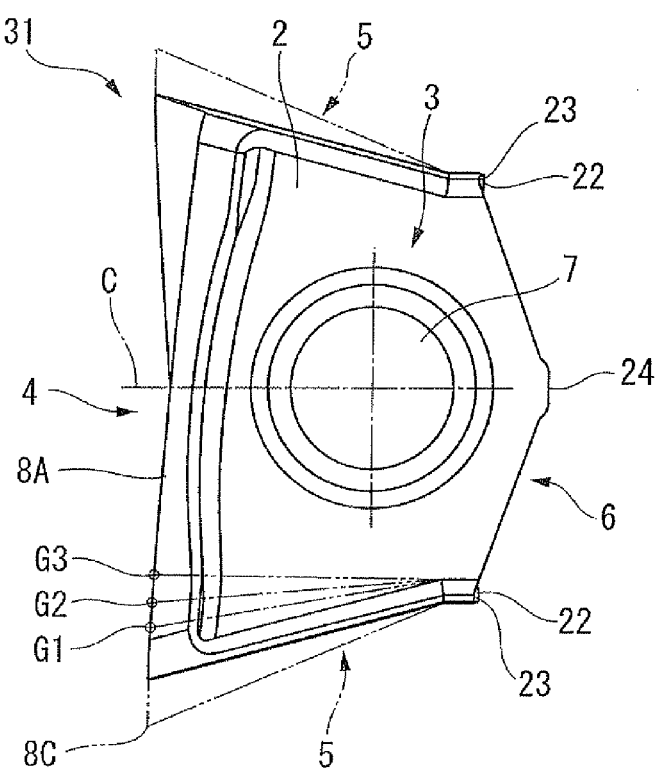
FIG. 25 is a front view of the cutting insert of the modified example shown in FIG. 24.
Figure 26:
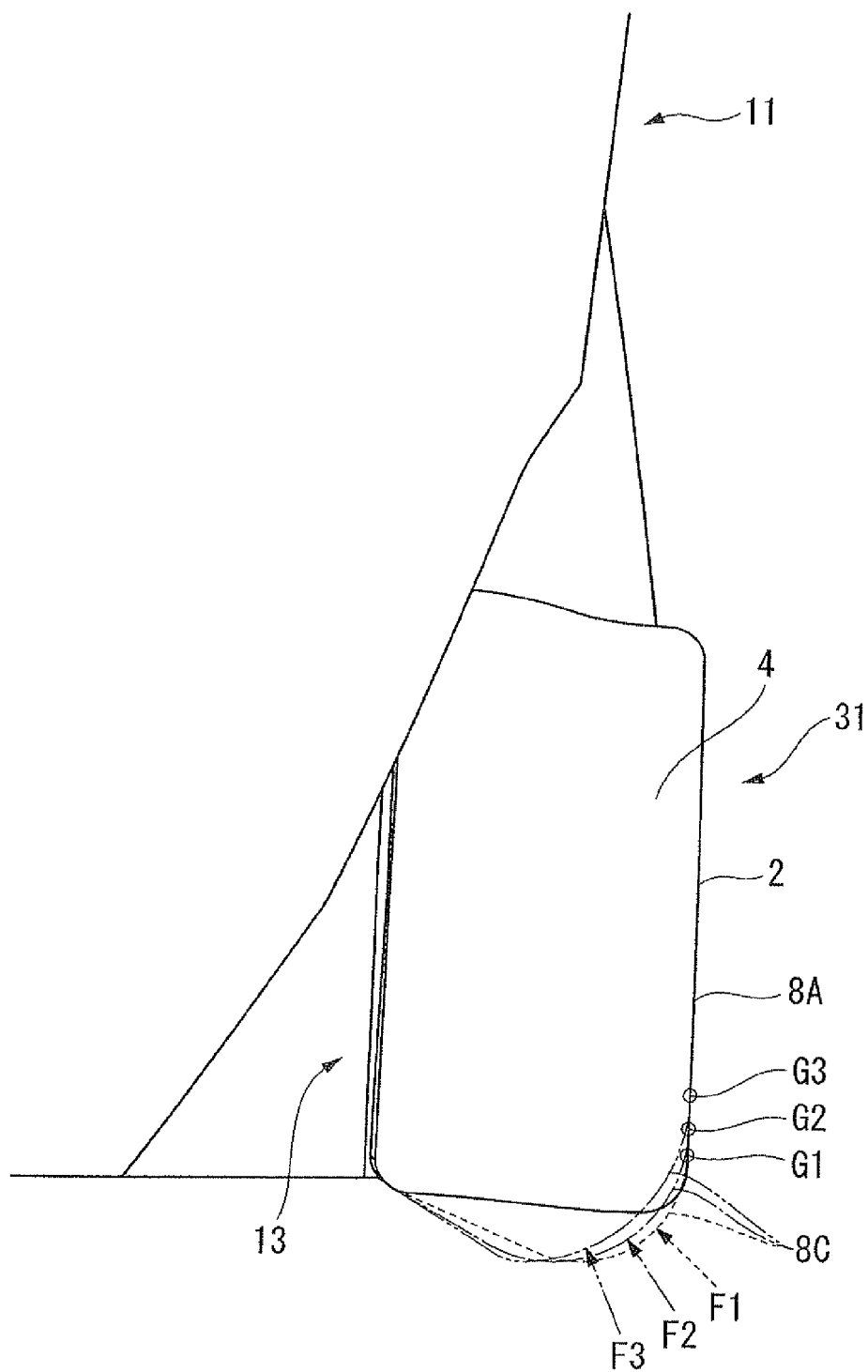
FIG. 26 is a drawing which shows a modified example of the removable insert-type cutting tool of the second embodiment to which the cutting insert of the modified example shown in FIG. 24 is attached.
Figure 27:
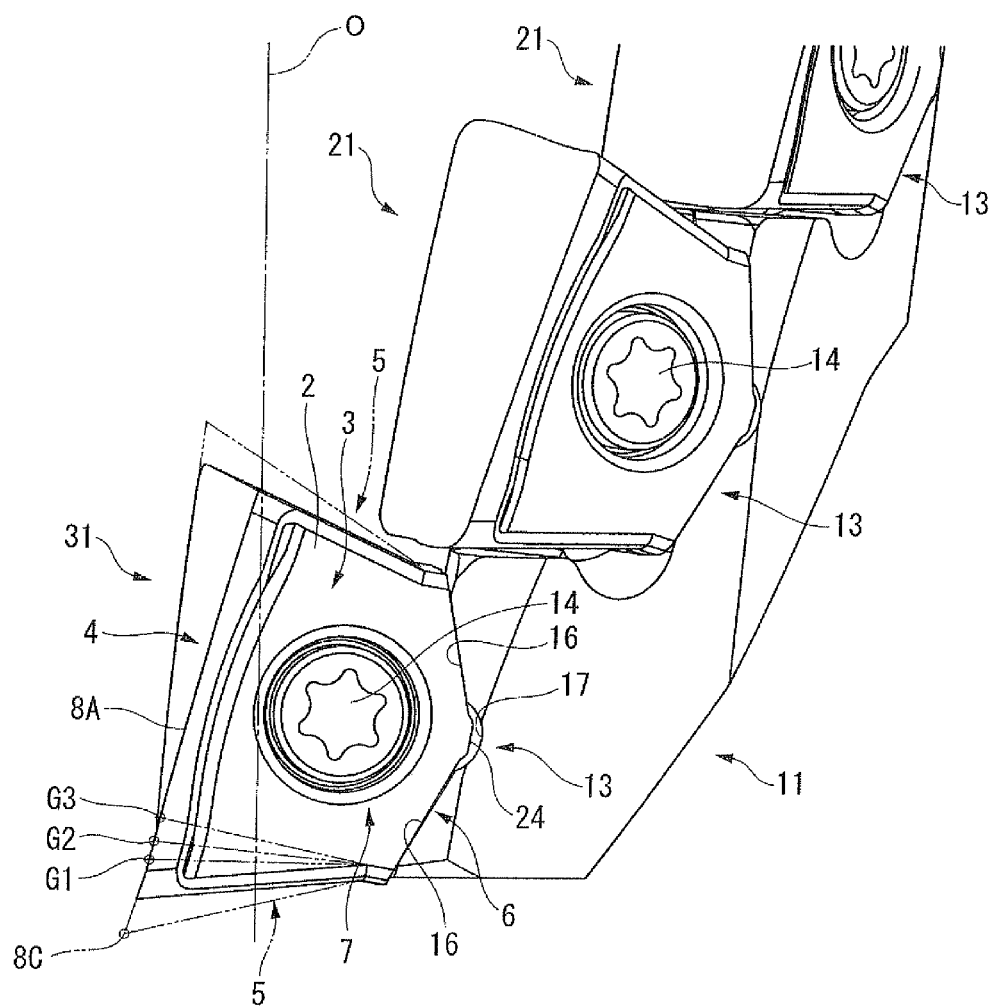
FIG. 27 is a side view of the modified example shown in FIG. 26.

FIG. 24 and FIG. 25 explain a modified example of the cutting insert 31 of the second embodiment. FIG. 26 and FIG. 27 explain a modified example of the removable insert-type cutting tool of the second embodiment to which the modified example of the cutting insert 31 is attached. In the modified example of the removable insert-type cutting tool, as shown in FIG. 26 and FIG. 27, among a plurality of cutting inserts attached to the tool main body 11, the modified example of the cutting insert 31 is attached to the insert seat 13 at the most leading end of the tool main body 11 and the cutting inserts 21 of the second embodiment are attached to the remaining insert seats 13.

Then, in the modified example of the cutting insert 31, the seating surface 6 thereof is similar in shape and dimension to the cutting insert 21 of the second embodiment as shown with the solid line in FIG. 25 and FIG. 27. Furthermore, as shown with the broken line (radius F1), the dashed-dotted line (radius F2) or the dashed-two dotted line (radius F3) in FIG. 24 and FIG. 26, the radius of the corner edge 8C formed on the rake face 4 is different in size from that of the cutting insert 21 of the second embodiment. The radius of the modified example of the corner edge 8C is made greater than the radius of the corner edge 8C of the second embodiment.

Therefore, in the modified example of the removable insert-type cutting tool, various types of cutting inserts 21, 31 equal in shape and dimension to the seating surface 6 and different in radius of the curvature of the corner edge 8C are attached to the insert seats 13. In the modified example of the removable insert-type cutting tool, the modified examples of the cutting inserts 31 attached to the plurality of insert seats 13 at the leading end of the tool main body 11 are made equal to each other in radius of the corner edge 8C. Furthermore, in FIG. 24 and FIG. 26, only the corner edge 8C given below in these drawings is shown with the broken line, the dashed-dotted line or the dashed-two dotted line. The corner edge 8C on the upper side is also made greater in radius than the corner edge 8C of the second embodiment.

In this instance, in the cutting inserts 1, 21 of the first and the second embodiments, each of the cutting edges 8A is formed at a ridge part between the rake face 4 of the insert main body 2 and the polygonal surface 3. Furthermore, on the polygonal surface 3 of the insert main body 2, a border adjacent to the rake face 4 thereof is formed in a step manner so as to project further in the thickness direction with respect to a part adjacent to the seating surface 6. A part of the corner edge 8C adjacent to the major cutting edge 8A is formed at a part of the polygonal surface 3 which projects further. In the modified example of the cutting insert 31, the corner edge 8C thereof is made greater in radius than the corner edge 8C of the cutting insert 21 of the second embodiment, as compared with the cutting insert 21 of the second embodiment. More specifically, as shown with the dashed-two dotted line in FIG. 25 and FIG. 27, a contact point G1 (in the case of the radius F1), a G2 (in the case of the radius F2) and a G3 (in the case of the radius F3) between the cutting edge 8A and the corner edge 8C are positioned backward along the major cutting edge 8A and the side surface 5 of the insert main body 2 is projected.

A workpiece is subjected to, for example, groove cutting or shoulder cutting by using the above modified example of the removable insert-type cutting tool (a radius end mill) to which various types of the cutting inserts 21, 31 are attached. In this instance, there is a case where a recessed cylindrical surface or the like is formed at a corner between the bottom surface and the wall surface of a machined surface such as a groove formed on the workpiece. This recessed cylindrical surface or the like may be different in radius of a recessed circular arc on the cross section. Even in this instance, the cutting insert 21 at the most leading end of the removable insert-type cutting tool of the second embodiment is only exchanged to the above modified example of the cutting insert 31 having the corner edge 8C with the radii F1, F2, F3 depending on the radius of the recessed circular arc, thus making it possible to correspond to change in radius of the recessed circular arc. Thereby, it is possible to correspond to cutting of the recessed circular arc different in radius of a corner of the machined surface by using one tool main body 11.

Then, even where the corner edge 8C having different radii of F1, F2, F3 as described above is formed in the vicinity of the rake face 4, the cutting inserts 1, 21, 31 of the present invention can be seated stably and securely by the seating surface 6 and a part of the polygonal surface 3 adjacent to the seating surface 6. Therefore, it is possible to attach the modified example of the cutting insert 31 securely to the same insert seat 13 to which the cutting insert 21 of the second embodiment can be attached and to perform cutting. Furthermore, the insert seats 13 are arrayed in the shape of stairs. Therefore, the side surface 5 will not interfere with the cutting insert 21 to be attached to an adjacent insert seat 13, even if the side surface is projected as described above.

Furthermore, in the cutting inserts 1, 21 of the first and the second embodiments, the part of the polygonal surface 3 adjacent to the rake face 4 is formed so as to project in the thickness direction with respect to a part adjacent to the seating surface 6. A part on the side of the major cutting edge 8A of the corner edge 8C is formed at this part. Therefore, if the corner edge 80 of the modified example of the cutting insert 31 is to have the radii F1, F2, F3 greater than the radius of the cutting insert 21 of the second embodiment, it is possible to avoid a situation that a ridge part between the polygonal surface 3 and the side surface 5 is notched greatly as compared with the original cutting insert 21 of the second embodiment. Therefore, it is possible to prevent modification of the ridge part resulting from increase in radius of the corner edge 8C from affecting the vicinity of the seating surface 6. Thus, the cutting inserts 1, 21 can be seated more securely and stably.

Furthermore, the corner edge 8C is formed at a part which projects at the part of the polygonal surface 3, adjacent to the rake face 4. Thereby, even where the radii thereof F1, F2, F3 are made greater than the radius of the original cutting insert 21 of the embodiment 2, the contact points G1, G2, G3 with the major cutting edge 8A can be positioned backward to form the corner edge 8C. Therefore, as compared with a case where the radii F1, F2, F3 are increased by just allowing the side surface 5 to project, it is possible to prevent a tool angle of the corner edge 8C from being made unnecessarily great and also to suppress defects. Furthermore, as shown in FIG. 26 and FIG. 27, even the modified example of the cutting insert 31 having individually different radii of F1, F2, F3 is able to give an equal set height to the end of the corner edge 8C at the leading end in the direction of the axis line O. Therefore, where cutting machining is performed, as described above, at a corner cross section which is different in radius of the recessed circular arc by using a numerically controlled machine tool or others, it is rarely-necessary to customize programs of the machine tool.

A description has been made above for preferred embodiments of the present invention, however, the present invention shall not be restricted thereto. The present invention may be subjected to addition of constitution, omission, replacement and other modifications within a scope not departing from the spirit of the present invention. The present invention shall not be restricted to the above description and will be restricted only by the scope of the attached claims.

INDUSTRIAL APPLICABILITY

The present invention relates to a cutting insert removably attached to a removable insert-type cutting tool used in milling machining and a removable insert-type cutting tool to which the cutting insert is attached.

According to the present invention, it is possible to provide a cutting insert which can be attached to an insert seat stably and highly accurately and a removable insert-type cutting tool to which the cutting insert is attached.

DESCRIPTION OF THE REFERENCE SYMBOLS 1, 21, 31: CUTTING INSERT
2: INSERT MAIN BODY
3: POLYGONAL SURFACE
4: RAKE FACE
5: SIDE SURFACE
6: SEATING SURFACE
6A: CONTACT PORTION
7: ATTACHMENT HOLE
8A: MAJOR CUTTING EDGE
8B: MINOR CUTTING EDGE
8C: CORNER EDGE
11: TOOL MAIN BODY
12: CHIP REMOVING FLUTE
13: INSERT SEAT
14: CLAMP SCREW
15: BOTTOM SURFACE OF INSERT SEAT 13
15A: THREAD HOLE
16: WALL SURFACE OF INSERT SEAT 13
17, 19: RELIEF PART
18: STEP SURFACE
20: RECESS
22: PROJECTION
24: RAISED PORTION
O: AXIS LINE OF TOOL MAIN BODY 11
T: ROTATING DIRECTION OF CUTTING TOOL
C: INSERT CENTER LINE
F1, F2, F3: RADIUS OF CORNER EDGE 80
G1, G2, G3: CONTACT POINT BETWEEN MAJOR CUTTING EDGE A AND CORNER EDGE 80
θ: V-SHAPE INCLUDED ANGLE WHEN THE SEATING SURFACE 6 IS VIEWED IN THE THICKNESS DIRECTION OF THE INSERT MAIN BODY 2

The invention claimed is:

1. A cutting insert attachable to a tool main body of a removable insert-type cutting tool, the cutting insert comprising:
    an insert main body having an upper surface, a lower surface and a plurality of side surfaces; and
    a first cutting edge formed at a ridge part between a first side surface as a rake face among the plurality of side surfaces and the upper surface, wherein
    the lower surface is formed in a flat surface shape which can be closely attached to the tool main body,
    a second side surface which is positioned on the opposite side of the insert main body with respect to the first side surface and given as a seating surface in contact with an insert seat of the tool main body for attaching the cutting insert is formed in a V-shape when viewed from above, that is, when the insert main body is viewed in the thickness direction, and formed in a recessed V-shape when viewed from the cross section intersecting with the lower surface and the second side surface, of a first contact surface and a second contact surface assuming the recessed V-shape, on the first contact surface closer to the upper surface than the lower surface, there is formed a first contact portion which can be in contact with the tool main body, and
    the first contact portion is formed in such a manner that the first contact surface is raised in a curve shape when viewed from the above-described cross section.

2. The cutting insert according to claim 1, wherein
    a second cutting edge is formed at a ridge part between the lower surface and the first side surface on the insert main body,
    the upper surface is formed in a flat surface shape which can be closely attached to the tool main body,
    a second contact portion which can be in contact with the tool main body is formed on the second contact surface closer to the lower surface than the upper surface of the second side surface, and
    the second contact portion is formed in such a manner that the second contact surface is raised in a curve shape when viewed from the above-described cross section.

3. The cutting insert according to claim 1, wherein an included angle of a V-shape formed by the second side surface when viewed in the thickness direction is within a range of 90° to 150°.

4. The cutting insert according to claim 1, wherein the second side surface assumes a raised V-shape when viewed in the thickness direction and there is formed an attachment hole which penetrates through the insert main body in the thickness direction.

5. The cutting insert according to claim 1, wherein
    a projection projecting from the second side surface is formed at both ends of the second side surface which assumes a V-shape when viewed in the thickness direction.

6. The cutting insert according to claim 5, wherein the projection is formed in a raised curved surface shape.

7. The cutting insert according to claim 5, wherein the second side surface is formed in a raised V-shape when viewed in the thickness direction, a pair of raised portions is formed at the top of the second side surface formed in a raised V-shape, at a predetermined interval in the thickness direction, and the projection is formed so as to be positioned between the pair of raised portions in the thickness direction.

8. A removable insert-type cutting tool which is provided with the cutting insert according to claim 1, and
    a tool main body having an insert seat capable of removably attaching the cutting insert, wherein
    the insert seat is provided with a bottom surface which faces in the radial direction of the tool main body and formed in a flat surface shape so as to be closely attached to the upper surface or the lower surface of the insert main body and a wall surface formed so that the second side surface of the insert main body can be in contact therewith, and
    the wall surface is formed in a V-shape which is reverse to the second side surface in a relationship to fit to each other when the insert main body is viewed from above in the radial direction of the tool main body and formed so as to be fitted into the second side surface of the insert main body.

9. The removable insert-type cutting tool according to claim 8, wherein the tool main body is formed externally in a cylindrical shape at the center of the axis line, a chip removing flute twisted around the axis line from the leading end of the tool main body to the rear end thereof is formed on the outer circumference surface of the tool main body, the plurality of insert seats allow the individual bottom surfaces to face the outer circumference so as to be opened on a wall surface of the chip removing flute facing in the rotating direction of the cutting tool, and the wall surface is arrayed so as to assume a shape of helical stairs along the twisted chip removing flute.

10. The removable insert-type cutting tool according to claim 8, wherein a plurality of the insert seats are formed on the tool main body and various types of cutting inserts which are equal to each other in shape and dimension of the second side surface and different in radius of a corner edge formed as the cutting edge at a corner of the first side surface are attached to the insert seats.

11. A cutting insert which is provided with a polygonal-shaped insert main body having two polygonal surfaces spaced away from each other and a plurality of side surfaces formed between the polygonal surfaces and a cutting edge which is formed as a rake face on a peripheral edge of the first side surface among the plurality of side surfaces, wherein among the plurality of side surfaces, the second side surface which is positioned on the opposite side of the first side surface and given as a seating surface in contact with an insert seat of the tool main body for attaching the cutting insert is formed in a V-shape when viewed from the thickness direction of the insert main body and includes two contact portions, each of which is formed in a raised curve shape at a cross section along the thickness direction, and the two contact portions are formed in a recessed V-shape so as to be greater in depth moving toward the center of the second side surface on the cross section along the thickness direction.

12. The cutting insert according to claim 11, wherein an included angle of the V-shape formed by the second side surface when viewed in the thickness direction is within a range of 90° to 150°.

13. The cutting insert according to claim 11, wherein the second side surface is formed in a raised V-shape when viewed in the thickness direction and provided with an attachment hole penetrating through the insert main body in the thickness direction.

14. The cutting insert according to claim 11, wherein a projection projecting from the second side surface is formed at both ends of the second side surface which is formed in a V-shape when viewed from the thickness direction.

15. The cutting insert according to claim 14, wherein the projection is formed in a raised curved surface shape.

16. The cutting insert according to claim 14, wherein the second side surface is formed in a raised V-shape when viewed in the thickness direction, a pair of raised portions is formed at the top of the second side surface formed in a raised V-shape, at a predetermined interval in the thickness direction, and the projection is formed so as to be positioned between the pair of raised portions in the thickness direction.

17. The cutting insert according to claim 11, wherein the polygonal surface is formed in such a manner that a border on the first side surface projects in the thickness direction further with respect to a part of the second side surface.

18. A removable insert-type cutting tool which is provided with the cutting insert according to claim 11, and a tool main body having an insert seat to which the cutting insert can be removably attached and rotating around the axis line; wherein the insert seat is formed on an outer circumference of the tool main body, with the wall surface facing in the rotating direction of the cutting tool and the bottom surface facing to the outer circumference or in the axial direction, the insert seat is provided with a bottom surface and a wall surface, of the two polygonal surfaces, one of the polygonal surfaces is closely attached to the bottom surface of the insert seat, and of the two contact portions, the contact portion closer to the other polygonal surface is in contact with the wall surface formed in a V-shape which is reverse to the second side surface in a relationship to fit to each other when viewed from the thickness direction.

19. The removable insert-type cutting tool according to claim 18, wherein the tool main body is formed externally in a cylindrical shape at the center of the axis line, there is formed on the outer circumference surface thereof a chip removing flute which is twisted around the axis line from the leading end of the tool main body to the rear end thereof, and the plurality of insert seats are arrayed, with the individual bottom surfaces facing to the outer circumference so as to be opened on a wall surface of the chip removing flute in the rotating direction of the cutting tool, in such a manner that the wall surface assumes a shape of helical stairs along the twisted chip removing flute.

20. The removable insert-type cutting tool according to claim 18, wherein the plurality of the insert seats are formed in the tool main body and various types of the cutting inserts which are equal to each other in shape and dimension of the second side surface and different in radius of the corner edge formed as the cutting edge at a corner of the first side surface are attached to the insert seats.

* * * * *